US009804766B2

(12) United States Patent
Choi

(10) Patent No.: US 9,804,766 B2
(45) Date of Patent: Oct. 31, 2017

(54) ELECTRONIC DEVICE AND METHOD OF DISPLAYING PLAYLIST THEREOF

(71) Applicant: Samsung Electronics Co., Ltd., Gyeonggi-do (KR)

(72) Inventor: Young-Keun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 395 days.

(21) Appl. No.: 14/226,199

(22) Filed: Mar. 26, 2014

(65) Prior Publication Data

US 2014/0298172 A1 Oct. 2, 2014

(30) Foreign Application Priority Data

Apr. 1, 2013 (KR) ........................ 10-2013-0035305

(51) Int. Cl.
*G06F 3/0488* (2013.01)
*G06F 3/0482* (2013.01)
*G11B 27/34* (2006.01)

(52) U.S. Cl.
CPC .......... *G06F 3/0488* (2013.01); *G06F 3/0482* (2013.01); *G06F 3/04886* (2013.01); *G11B 27/34* (2013.01)

(58) Field of Classification Search
CPC .................................................... G11B 27/34
See application file for complete search history.

(56) References Cited

U.S. PATENT DOCUMENTS

| 9,030,419 | B1* | 5/2015 | Freed | G06F 3/0416 345/156 |
|---|---|---|---|---|
| 2002/0154177 | A1* | 10/2002 | Barksdale | G06F 17/30126 715/853 |
| 2004/0049489 | A1* | 3/2004 | Yabe | G11B 27/105 |
| 2004/0230599 | A1* | 11/2004 | Moore | G06F 3/0481 |
| 2005/0086681 | A1* | 4/2005 | Ebihara | G11B 27/02 725/1 |
| 2005/0289164 | A1* | 12/2005 | Yoon | G06F 17/30144 |
| 2006/0067171 | A1* | 3/2006 | Elmers | G11B 27/329 369/30.3 |
| 2006/0218499 | A1* | 9/2006 | Matthews | G06F 17/30616 715/765 |

(Continued)

FOREIGN PATENT DOCUMENTS

EP 1 394 802 A2 3/2004
EP 1 523 009 A1 4/2005

(Continued)

OTHER PUBLICATIONS

Japanese Search Report dated Sep. 12, 2017.

*Primary Examiner* — Kieu Vu
*Assistant Examiner* — Alvaro R Calderon, IV
(74) *Attorney, Agent, or Firm* — Cha & Reiter, LLC

(57) ABSTRACT

A user interface method employed by an electronic device displays a folder playlist playable by an application, on a touch screen and detects a touch selecting one folder in the displayed folder playlist. A touch gesture is detected comprising a continuous movement of a touch and performs a sorting operation using a name representation of a storage path of a folder where the touch is detected, in response to the continuous movement of the detected touch gesture.

12 Claims, 15 Drawing Sheets

(56) References Cited

U.S. PATENT DOCUMENTS

| | | | |
|---|---|---|---|
| 2007/0003307 A1* | 1/2007 | Maheshwari | G06F 3/0486 399/81 |
| 2007/0101296 A1* | 5/2007 | Won | G06F 3/0482 715/841 |
| 2008/0062141 A1* | 3/2008 | Chandhri | G06F 3/0482 345/173 |
| 2008/0215980 A1* | 9/2008 | Lee | G06F 3/0486 715/716 |
| 2008/0313568 A1* | 12/2008 | Park | G06F 3/04817 715/835 |
| 2009/0070339 A1* | 3/2009 | Cho | G11B 27/329 |
| 2009/0106685 A1* | 4/2009 | Care | G06F 3/0481 715/772 |
| 2009/0307623 A1* | 12/2009 | Agarawala | G06F 3/04815 715/765 |
| 2010/0020048 A1* | 1/2010 | Narita | G06F 3/04815 345/204 |
| 2010/0088641 A1* | 4/2010 | Choi | G06F 3/0482 715/828 |
| 2010/0205566 A1* | 8/2010 | Matoba | G06F 3/0488 715/838 |
| 2010/0218663 A1* | 9/2010 | Choi | G06F 3/0482 84/609 |
| 2010/0235794 A1* | 9/2010 | Ording | G06F 3/0485 715/863 |
| 2010/0262906 A1* | 10/2010 | Li | G06F 3/0488 715/702 |
| 2011/0010672 A1* | 1/2011 | Hope | G06F 3/04817 715/841 |
| 2011/0022983 A1* | 1/2011 | Kim | G06F 3/0481 715/815 |
| 2011/0035705 A1* | 2/2011 | Faenger | G06F 17/30053 715/811 |
| 2011/0041099 A1 | 2/2011 | Weise et al. | |
| 2011/0055753 A1* | 3/2011 | Horodezky | G06F 3/04883 715/810 |
| 2011/0163971 A1* | 7/2011 | Wagner | G06F 3/04817 345/173 |
| 2011/0164042 A1* | 7/2011 | Chaudhri | G06F 3/0481 345/473 |
| 2011/0191367 A1* | 8/2011 | Wook | G06F 17/30 707/769 |
| 2011/0225492 A1* | 9/2011 | Boettcher | G06F 3/0485 715/702 |
| 2011/0246918 A1* | 10/2011 | Henderson | G06F 3/04817 715/769 |
| 2011/0285659 A1* | 11/2011 | Kuwabara | G06F 3/041 345/173 |
| 2011/0289459 A1* | 11/2011 | Athans | G06F 3/0481 715/854 |
| 2011/0307836 A1* | 12/2011 | Cho | G06F 17/30058 715/838 |
| 2012/0011437 A1* | 1/2012 | James | G06F 1/1643 715/702 |
| 2012/0030623 A1* | 2/2012 | Hoellwarth | G06F 3/04817 715/811 |
| 2012/0030628 A1* | 2/2012 | Lee | G06F 3/0486 715/835 |
| 2012/0036460 A1* | 2/2012 | Cieplinski | G06F 3/0481 715/769 |
| 2012/0038579 A1* | 2/2012 | Sasaki | G06F 3/016 345/173 |
| 2012/0038580 A1* | 2/2012 | Sasaki | G06F 3/016 345/173 |
| 2012/0050185 A1* | 3/2012 | Davydov | G06F 3/04883 345/173 |
| 2012/0124513 A1* | 5/2012 | Shim | G06F 3/0488 715/801 |
| 2012/0158752 A1* | 6/2012 | Chakka | G06F 17/30115 707/752 |
| 2012/0185456 A1* | 7/2012 | Hart | G06F 3/04817 707/706 |
| 2012/0324398 A1* | 12/2012 | Lee | H04N 21/4312 715/810 |
| 2013/0010000 A1* | 1/2013 | Chiu | G06F 3/0488 345/676 |
| 2013/0024796 A1* | 1/2013 | Seo | G06F 3/04883 715/769 |
| 2013/0024821 A1* | 1/2013 | Lee | G06F 3/0486 715/863 |
| 2013/0055083 A1* | 2/2013 | Fino | G06F 3/0485 715/716 |
| 2013/0139109 A1* | 5/2013 | Kim | G06F 3/04883 715/835 |
| 2013/0155072 A1* | 6/2013 | Chiu | G06T 13/80 345/473 |
| 2013/0227463 A1* | 8/2013 | Andersson Reimer | G06F 3/04842 715/779 |
| 2013/0293481 A1* | 11/2013 | You | G06F 3/0482 345/173 |
| 2014/0096083 A1* | 4/2014 | Kim | G06F 3/04842 715/835 |
| 2014/0143738 A1* | 5/2014 | Underwood, IV | H04L 51/38 715/863 |
| 2014/0188946 A1* | 7/2014 | Hartman | G06F 17/30958 707/805 |
| 2014/0282011 A1* | 9/2014 | Dellinger | G06F 17/30256 715/731 |

FOREIGN PATENT DOCUMENTS

| | | |
|---|---|---|
| EP | 2 148 269 A1 | 1/2010 |
| EP | 2 226 715 A2 | 9/2010 |
| EP | 2 395 440 A2 | 12/2011 |
| JP | 2008-276575 A | 11/2008 |
| JP | 2011-76217 A | 4/2011 |
| JP | 2012-504837 A | 2/2012 |
| KR | 10-2004-0062310 A | 7/2004 |
| KR | 10-2004-0074758 A | 8/2004 |
| KR | 10-0631657 B1 | 9/2006 |
| KR | 10-2008-0083290 A | 9/2008 |

* cited by examiner

ELECTRONIC DEVICE AND METHOD OF DISPLAYING PLAYLIST THEREOF

CLAIM OF PRIORITY

This application claims priority under 35 U.S.C. §119 to an application filed in the Korean Intellectual Property Office on Apr. 1, 2013 and assigned Serial No. 10-2013-0035305, the contents of which are incorporated herein by reference.

BACKGROUND

1. Technical Field

The present system concerns an electronic device for displaying and managing a playlist.

2. Description of the Related Art

Services and applications provided by known electronic devices like a smart phone, a note PC, and a tablet PC, are expanding continuously. Services and applications are typically supported by a portable electronic device using a touch screen. In a music player for playing an audio file or a video player for playing a video file, an audio file or a video file selected by a user may be played. A user may play an audio file from an audio file playlist through a music player or play a video file from a video file playlist through a video player.

SUMMARY

A user interface method employed by an electronic device displays a folder playlist playable by an application, on a touch screen and detects a touch selecting one folder in the displayed folder playlist. A touch gesture is detected comprising a continuous movement of a touch and performs a sorting operation using a name representation of a storage path of a folder where the touch is detected, in response to the continuous movement of the detected touch gesture.

In a feature, the sorting operation comprises generating a new folder name representation having one of, (a) an upper hierarchical folder name and (b) a two level hierarchical upper folder name representing a current storage path of the folder identified by the detected touch gesture and displaying the generated new folder name representation. Also a location of the new folder name representation is changeable in the playlist and the two level hierarchical folder name comprises two portions comprising upper and lower portions of the folder name provided on two different adjacent rows. A folder is sorted on the basis of the upper hierarchical folder name in the current storage path of the folder where the touch is detected and the continuous movement of the one touch comprises a physical contact that is continuously maintained on the touch screen. The continuous movement of the touch comprises one of a flick, drag, and rotate movement. The detection of the touch gesture comprises a multiple touch detected on the text representing a current storage path of the folder and the continuous movement of the detected multiple touch comprises the continuous movement of at least one touch of the multiple touch. Further, a portion of the text representation of the current storage path is abbreviated and displayed in response to the continuous movement of at least one touch of the multiple touch.

In a further feature, the abbreviation operation is performed to display both a current folder name and an upper hierarchical folder name of the current storage path in response to the continuous movement. The abbreviation operation is also performed on at least one other folder having the same name as the upper hierarchical folder of the current storage path of the folder in response to the continuous movement and the continuous movement of the multiple touch comprises a pinch, spread, or rotate gesture.

In another feature, an electronic device user interface system comprises a touch screen and a control unit. The touch screen displays a folder playlist of an application. the control unit controls the touch screen, wherein the control unit detects a touch on a text representation of a folder in the folder playlist displayed on the touch screen, and performs a sorting operation using a name representation of a storage path of a folder where the touch is detected, in response to the continuous movement of the detected touch.

In a further feature, the control unit performs one of, (a) generating a new folder name representation having one of, (i) an upper hierarchical folder name and (ii) a two level hierarchical upper folder name representing a current storage path of the folder identified by the detected touch gesture and displaying the generated new folder name representation and (b) performs a sorting operation using an upper hierarchical folder name of a storage path of a folder where the touch is detected.

In yet another feature, an electronic device user interface system comprises a touch screen and a control unit. The touch screen displays a folder playlist of an application. the control unit controls the touch screen, wherein the control unit detects a multiple touch on a text representation of a folder in a folder playlist displayed on the touch screen, and abbreviates a text portion of a storage path of the folder and displays the abbreviated text portion in response to a continuous movement of at least one touch of the detected multiple touch. The continuous movement of at least one touch in the detected multiple touch comprises one of a pinch, spread, and rotate gesture, a fixed touch, or a continuous movement of each touch of the multiple touch.

BRIEF DESCRIPTION OF THE DRAWINGS

The above features and advantages of the system will become more apparent from the following detailed description when taken in conjunction with the accompanying drawings in which.

DETAILED DESCRIPTION

Figure 1:
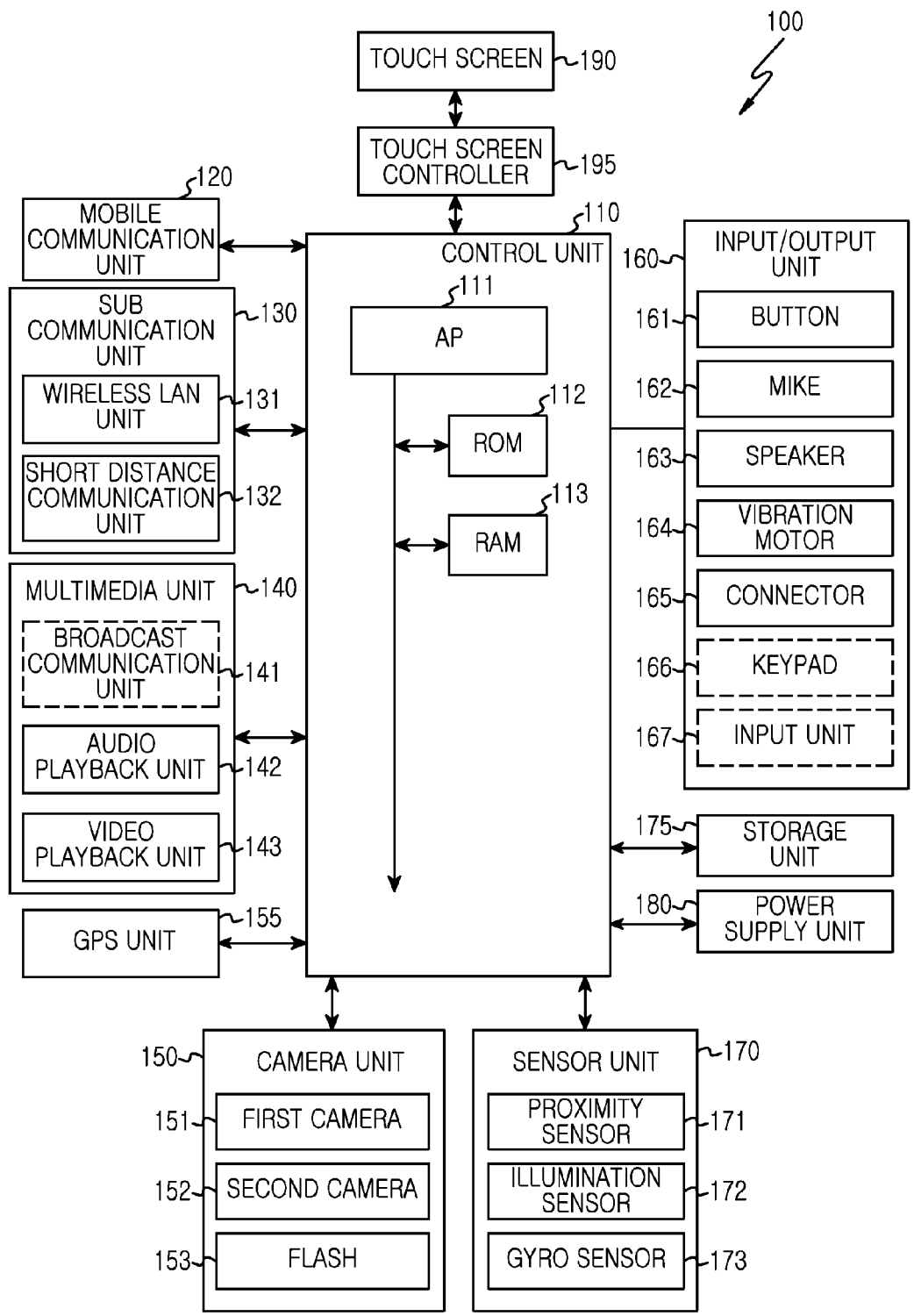
FIG. 1 shows an electronic device according to invention principles.

A system will be described in more detail with reference to the accompanying drawings. Hereinafter, embodiments will be described in more detail with reference to the accompanying drawings. Like reference numerals refer to like elements throughout.

Although terms like first and second may be used to describe various components, the components are not limited to the terms. These terms are used only to distinguish one component from other components. For example, a first component may be referred to as a second component and vice versa without being departing from the scope of the present invention. As used herein, the term and/or includes combinations of one or more of the associated listed items.

Application refers to software executable on a computer operating system (OS) or a mobile OS by a user directly. For example, there are a word processor application, a spread sheet application, a social network system (SNS) application, a chatting application, a map application, a music player application, and a video player application.

A widget refers to a mini application of a graphic user interface (GUI) for smoothly supporting an interaction between a user and an application or OS. For example, there are a weather widget, a calculator widget, and a watch widget. The widget may be installed in a shortcut icon form to a desktop, an electronic device, a blog, a café, or a personal homepage and may be used to directly execute a corresponding service through a click instead of a web browser. Additionally, the widget may include a shortcut icon for a designated path or a shortcut icon for executing a designated application.

A singular form used for the terms herein may include a plural form unless being clearly different from the context. The meaning of "include," "comprise," "including," or "comprising," specifies a property, a region, a fixed number, a step, a process, an element and/or a component but does not exclude other properties, regions, fixed numbers, steps, processes, elements and/or components. Like reference numerals refer to like elements throughout.

An electronic device system responds to a touch and/or a touch gesture in displaying a playlist. FIG. 1 shows an electronic device 100 connected to an external device (not shown) through a mobile communication unit 120, a sub communication unit 130, and a connector 165. The external device includes another electronic device (not shown), a mobile phone (not shown), a smart phone (not shown), an input unit (not shown), a tablet PC (not shown), and a server (not shown). An electronic device, as a portable data transceiving device, may be equipped with at least one touch screen. Such an electronic device includes a mobile phone, a smart phone, a tablet PC, a 3D-TV, a smart TV, an LED TV, and an LCD TV, and also includes a peripheral connectable to the electronic device 100 or a device transmitting/receiving data with another device at a long distance.

The electronic device 100 includes a touch screen 190 and a touch screen controller 195. Additionally, the electronic device 100 includes a control unit 110, a mobile communication unit 120, a sub communication unit 130, a multimedia unit 140, a camera unit 150, a GPS unit 155, an input/output unit 160, a sensor unit 170, a storage unit 175, and a power supply unit 180. The sub communication unit 130 includes at least one of a wireless LAN unit 131 and a short distance communication unit 132, and the multimedia unit 140 includes at least one of a broadcast communication unit 141, an audio playback unit 142, and a video playback unit 143. The camera unit 150 includes at least one of a first camera 151 and a second camera 152 and flash unit 153. The input/output unit 160 includes at least one of a button 161, a mike 162, a speaker 163, a vibration motor 164, a connector 165, a keypad 166, and an input unit 167. The sensor unit 170 includes a proximity sensor 171, an illumination sensor 172, and a gyro sensor 173.

The control unit 110 may include an application processor (AP) 111, a ROM 112 where a control program for controlling the electronic device 100 is stored, and a RAM 113 that stores signals or data input from the outside of the electronic device 100, or is used as a memory area for an operation performed in the electronic device 100.

The control unit 111 controls overall operation of the electronic device 100 and signal flow between the internal components of the electronic device 100, and processes data. The control unit 110 controls power supply from the power supply unit 180 to the internal components. Additionally, the control unit 110 executes OS and applications stored in the storage unit 175. The AP 111 may include a graphic processing unit (GPU) (not shown) for graphic processing. The AP 111 may be implemented with a core (not shown) and a GPU (not shown) as a system on chip (SoC). The AP 111 may include a single core, a dual core, a triple core, a quad core, and a multiple core. Additionally, the AP 111, the ROM 112, and the RAM 113 may be connected to each other through an internal bus. The control unit 110 may control the mobile communication unit 120, the sub communication unit 130, the multimedia unit 140, the camera unit 150, the GPS unit 155, the input/output unit 160, the sensor unit 170, the storage unit 175, the power supply unit 180, the touch screen 190, and the touch screen controller 195.

The control unit 110 displays a displayable folder playlist in a music application on a touch screen, detects a touch on one folder of a plurality of folders displayed on the folder playlist, and performs sorting associated with a storage path of the touch detected folder in response to a continuous movement of the touch. The control unit 110 may generate a new folder having one of an upper hierarchical folder name and a two level hierarchical upper folder name in a current storage path of the touch detected folder and may display the generated new folder. The two level hierarchical folder name comprises two portions comprising upper and lower portions of the folder name provided on two different adjacent rows. The control unit 110 may change a position of the new folder displayed on the playlist in response to a user request to arrange folders on the basis of the upper hierarchical folder name in the current storage path of the touch detected folder in response to the continuous movement of the touch. The control unit 110 detects the continuous movement of one touch when contact is continuously maintained on the touch screen. The control unit 110 detects flick, drag, or rotate gestures corresponding to the continuous movement of one touch and may detect a multi touch on a storage path of the folder as well as pinch, spread, or rotate gestures corresponding to the continuous movement of at least one touch.

Unit 110 may also detect the continuous movement of at least one touch of a multi touch gesture. For example, the control unit 110 may detect one fixed touch and the continuous movement of another touch. Additionally, the control unit 110 may detect a multi touch interaction continuous movement and may abbreviate and display a portion of the storage path in response to the continuous movement of at least one touch of the multi touch gesture. The control unit 110 may also abbreviate and display a current storage path in order to display both a current folder name and an upper hierarchical folder name on the current storage path of the folder in response to the continuous movement of at least one touch among the multi touch.

The control unit 110 may abbreviate and display at least one another folder name having the same name as the upper hierarchical folder on the current storage path of the folder in response to the continuous movement of at least one touch of the multi touch gesture. The mobile communication unit 120 allows the electronic device 100 to connect to an external device through a mobile communication by using at least one antenna (not shown) in response to a control of the control unit. The mobile communication unit 120 transmits/receives wireless signals in order for a voice call, a video call, a text message (i.e., SMS), a multimedia message (i.e., MMS), and data communication with a mobile phone (not shown) including using phone numbers input to the electronic device 100, a smart phone (not shown), a tablet PC, or another electronic device (not shown). The sub communication unit 130 may include at least one of the wireless LAN unit 131 and the short distance communication unit 132. For example, the sub communication unit 130 may include the wireless LAN unit 131 or the short distance communication unit 132, or both the wireless LAN unit 131 and the short distance communication unit 132.

The wireless LAN unit 131 may connect to the Internet wirelessly at a place where an access point (AP) (not shown) is installed, in response to a control of the control unit. The wireless LAN unit 131 supports the wireless LAN standards (i.e., IEEE802.11x) of the Institute of Electrical and Electronics Engineers (IEEE). The short distance communication unit 132 may perform a short distance communication wirelessly between the electronic device 100 and an external device in response to a control of the control unit. Short distance communication may include Bluetooth, infrared data association (IrDA), and Near Field Communication (NFC). The electronic device 100 may include at least one of the mobile communication unit 120, the wireless LAN unit 131, and the short distance communication unit 132. For example, the electronic device 100 may include a combination of the mobile communication unit 120, the wireless LAN unit 131, and the short distance communication unit 132. The term "communication unit" includes a mobile communication unit 120 and a sub communication unit 130. The communication unit may receive sound data executable in a music application from an external device in response to a control of the control unit and the control unit may store the sound data received from an external device in a storage unit.

The multimedia unit 140 includes the broadcast communication unit 141, the audio playback unit 142, or the video playback unit 143. The broadcast communication unit 141 receives broadcast signals (e.g., TV broadcast signals, radio broadcast signals, or data broadcast signals) and broadcast additional information (e.g., Electric Program Guide (ESP) or Electric Service Guide (ESG)) transmitted from an external broadcasting station through a broadcast communication antennal (not shown), and plays the received signals by using a touch screen, a video codec unit (not shown) in response to a control of the control unit. The audio playback unit 142 may play audio data (e.g., audio files in an mp3, wma, ogg, or way file extension) pre-stored in the storage unit 175 of the electronic device 100 or received from the outside of the portable device 100 by using an audio codec unit in response to a control of the control unit. The audio playback unit 142 may play data from a selected audio source in a music application through an audio codec unit in response to a control of the control unit. The audio playback unit 142 may play auditory feedback data (e.g., an output of an audio source pre-stored in a storage unit) corresponding to a touch detected from a folder playlist displayed on a music application or corresponding to the continuous movement of a touch through an audio codec unit in response to a control of the control unit.

The video playback unit 143 may play a digital video file (e.g., video files in an mpeg, mpg, mp4, avi, mov, or mkv file extension) pre-stored in the storage unit 175 of the electronic device 100 or received from the outside of the portable device 100, through a video codec unit in response to a control of the control unit. Applications installable to the electronic device 100 may play audio and video through an audio codec unit or a video codec unit. Additionally, the video playback unit 143 may play data from an audio source through an audio codec unit or a video codec unit. The multimedia unit 140 may include the audio playback unit 142 and the video playback unit 143 and exclude the broadcast communication unit 141. Additionally, the audio playback unit 142 or the video playback unit 143 of the multimedia unit 140 may be included in the control unit 110. The term "video codec unit" includes at least one video codec unit. In an embodiment of the present invention, the term "audio codec unit" includes at least one audio codec unit.

The camera unit 150 may include at least one of a first camera 151 at the front 100a (FIG. 2) and a second camera 152 at the rear 100c (FIG. 3), which are used for capturing a still image or video. The camera unit 150 may include at least one of the first camera 151 and the second camera 152. Additionally, the first camera 151 or the second camera 152 may include an auxiliary light source (for example, a flash 153) providing a light quantity necessary for shooting. The first camera 151 and the second camera 152 of the camera unit 150 may be located adjacent to an additional camera (not shown) to capture a 3D still image or 3D video (e.g., the first camera 151 of FIG. 1 at the front 100a of FIG. 2 and the second camera 152 of FIG. 3 at the rear 100c of FIG. 3 are spaced apart from the additional camera by an interval of greater than about 2 and less than about 8 cm.

The GPS unit 155 receives information (e.g., accurate position information and time information periodically from a plurality of GPS satellites (not shown) on. The electronic device 100 may obtain the position, speed, and time of the electronic device 100 by using radio waves received from a plurality of GPS satellites. Referring to the electronic device 100 shown in FIGS. 2 and 3, the button 161 includes a menu button 161b, a home button 161a, and a back button 161c at the bottom of the front 100a. The button 161 may include a power/lock button 161d and at least one volume button 161e at the side 100b. Additionally, the button 161 may include just a home button 161a. The button 161 may be implemented with a touch button instead of a physical button. Additionally, the button 161 may be displayed in the touch screen 190.

The microphone (mike) 162 generates electrical signals by receiving voice or sound from the outside in response to a control of the control unit. The electrical signals generated by the mike 162 may be converted by the audio codec unit and then, may be stored in the storage unit 175 or output through the speaker 163. At least one mike 162 may be positioned at the front 100a, the side 100b, and the rear 100c of the electronic device 100. Moreover, at least one mike may be positioned at just the side 100b. The speaker 163 may output the sound corresponding to various signals (for example, a wireless signal, a broadcast signal, an audio source, a video file, or photo shooting) of the mobile communication unit 120, the sub communication unit 130, and the multimedia unit 140, or the camera unit 150 through an audio codec unit in response to a control of the control unit.

The speaker 163 may output sound (for example, a touch operation sound corresponding to a phone call or a photo shooting button operation sound) corresponding to a function performed by the electronic device 100. At least one speaker 163 may be positioned at the front 100a, the side 100b, and the rear 100c of the electronic device 100. Referring to the electronic device 100 shown in FIGS. 2 and 3, a plurality of speakers 163a and 163b are positioned at the front 100a and the rear 100c. Moreover, the plurality of speakers 163a and 163b may be positioned at the front 100a.

Or, one speaker 163a may be positioned at the front 100a and a plurality of speakers (not shown) may be positioned at the rear 100c. Moreover, at least one speaker (not shown) may be positioned at the side 100b. The electronic device 100 including at least one speaker (not shown) may be positioned at the sides 100a and 100b may provide sound output effects different from when speakers positioned at the front 100a and the rear 100c. The speaker 163 may output sound corresponding to an audio source selected in a music application in response to a control of the control unit. The speaker 163 may output an auditory feedback corresponding to a touch detected from a folder playlist displayed on a music application or the continuous movement of a touch in response to a control of the control unit.

The vibration motor 164 may convert electrical signals into mechanical vibration in response to a control of the control unit. For example, the vibration motor 164 may include a linear vibration motor, a bar type vibration motor, a coin type vibration motor, or a piezoelectric vibration motor. When a voice call request is received from another electronic device (not shown), the vibration motor 164 operates in the electronic device 100 in a vibration mode. At least one vibration motor 164 may be positioned in the electronic device 100. Additionally, the vibration motor 164 may vibrate the entire electronic device 100 or a portion of the electronic device 100.

The vibration motor 164 may output a haptic feedback corresponding to an audio source selected by a music application in response to a control of the control unit. The vibration motor 164 may output a haptic feedback corresponding to a touch detected from a folder playlist displayed on a music application or the continuous movement of a touch in response to a control of the control unit. Additionally, the vibration motor 164 may provide various types of haptic feedback (for example, varying the intensity of vibration and a vibration duration time) in response to a control command of the control unit.

The connector 165 may be used as an interface for connecting the electronic device 100 to an external device (not shown) or a power source (not shown). In response to a control of the control unit, data stored in the storage unit 175 of the electronic device 100 are transmitted to an external device (not shown) or are received from an external device (not shown) through a wired cable connected to the connector 165. Power is input from a power source (not shown) or a battery (not shown) is charged through a wired cable connected to the connector 165. The keypad 166 may receive a key input from a user in order to control the electronic device 100. The keypad 166 includes a physical keypad (not shown) formed at the electronic device 100 or a virtual keypad (not shown) displayed on the touch screen 190. The physical keypad (not shown) formed at the electronic device 100 may be excluded according to a performance or structure of the electronic device 100.

The input unit 167 may touch or select an object (e.g., a menu, a text, an image, a figure, and an icon) displayed on the touch screen 190 of the electronic device 100. The input unit 167 may input characters by touching a touch screen of a capacitive type, a resistive type, or an electromagnetic induction type or using a virtual keyboard. The input unit 167 may include a haptic pen 167 where a built-in pen vibration device (not shown) such as vibration motor or an actuator vibrates by using control information received from a stylus or a communication unit of the electronic device 100. Moreover, a vibration device may vibrate by using sensing information detected from a sensor (for example, an accelerator sensor (not shown)) built in the input unit 167, instead of control information received from the electronic device 100.

The sensor unit 170 includes at least one sensor detecting a status of the electronic device 100. For example, the sensor unit 170 is positioned at the top of the front 100a of the electronic device 100 of a user, and may include a proximity sensor 171 detecting whether there is an approach to the electronic device 100, an illumination sensor 172 detecting the amount of light around the electronic device 100, a gyro sensor 173 detecting a direction by using the rotational inertia of the electronic device 100, an accelerator sensor (not shown) detecting each slope of three-axes (e.g., an x-axis, an y-axis, and a z-axis) applied to the electronic device 100, a gravity sensor (not shown) detecting an action direction of gravity, or an altimeter (not shown) detecting an altitude by measuring an atmospheric pressure.

The sensor unit 170 may measure an acceleration to which a movement acceleration and a gravity acceleration of the electronic device 170 are added, and may measure a gravity acceleration when the electronic device 170 does not move. For example, if the front of the electronic device 100 is upward, a gravity acceleration may be in the positive (+) direction, and if the rear of the electronic device 100 is upward, a gravity acceleration may be in the negative (−) direction. At least one sensor in the sensor unit 170 detects a status of the electronic device 100 and generates a signal corresponding to the detection and transmits it to the control unit. Sensors in the sensor unit 170 may be added or removed depending on required functions of the electronic device 100. The storage unit 175 may store signals or data input/output for operations of the mobile communication unit 120, the sub communication unit 130, the multimedia unit 140, the camera unit 150, the GPS unit 155, the input/output unit 160, the sensor unit 170, and the touch screen 190 in response to control of the control unit. The storage unit 175 may store a GUI (relating to a control program for a control of the electronic device 100 or the control unit, or an application downloaded from the outside), images for providing the GUI, user information, documents, databases, or related data.

The storage unit 175 may store a music application, a sound source displayed on a folder playlist, touch information (e.g., the X and Y coordinates of a detected touch position and a touch detection time) corresponding to a single touch or a multi touch, or hovering information (e.g., the X, Y, and Z coordinates of hovering and a hovering time) corresponding to hovering. The storage unit 175 may store metadata (e.g., a song title, an album, an artist, and a track number) of a sound source, the playlist, a cover art, and a storage path of a folder. The storage unit 175 may store auditory feedback sound data that a user can recognize (e.g., a sound source) output from the speaker 163 and haptic feedback data that a user can recognize (e.g., a haptic pattern) output from the vibration motor 164 in correspondence with a touch.

The term "storage unit" includes a ROM 112 and a ROM 113 in the control unit or a memory card (not shown) such as a micro SD card and a memory stick) mounted on the electronic device 100. The storage unit may include a nonvolatile memory, a volatile memory, a hard disk drive (HDD), or a solid state drive (SSD). The power supply unit 180 may supply power to at least one battery (not shown) in the electronic device 100 in response to a control of the control unit. At least one battery (not shown) may be disposed between the touch screen 190 at the front 100a and the rear 100c. Additionally, the power supply unit 180 may supply a power input from an external power source (not shown) to the electronic device 100 through a wired cable (not shown) connected to the connector 165. The touch screen 190 may provide a GUI corresponding to various services (e.g., a call, data transmission, broadcast, photo shooting, video, or application) to a user. The touch screen 190 transmits an analog signal corresponding to a touch input through the GUI, to a touch screen controller 195.

A touch is not limited to a contact between the touch screen 190 and the user body or the input unit 167 and may include hovering with an interval between the touch screen 190 and the user body or the input unit 167 of less than about 30 mm. It is apparent to those skilled in the art that a non-contact interval detectable by the touch screen 190 may vary depending on a performance or structure of the electronic device 100. The touch screen 190 may be implemented as a resistive type, a capacitive type, an infrared type, or an acoustic wave type. The touch screen controller 195 converts an analog signal corresponding to one or multiple touches received from the touch screen 190 into a digital signal (e.g., the X and Y coordinates corresponding to a detected touch position) and transmits the converted digital signal to the control unit. The control unit may calculate the X and Y coordinates corresponding to a touch position on a touch screen by using the digital signal received from the touch screen controller 195. Additionally, the control unit may control the touch screen 190 by using the digital signal received from the touch screen controller 195. For example, the control unit may display a selected shortcut icon 191f of FIG. 2 displayed on the touch screen 190, or may execute and display an application corresponding to the selected shortcut icon 191f, in response to an input touch.

Figure 2:
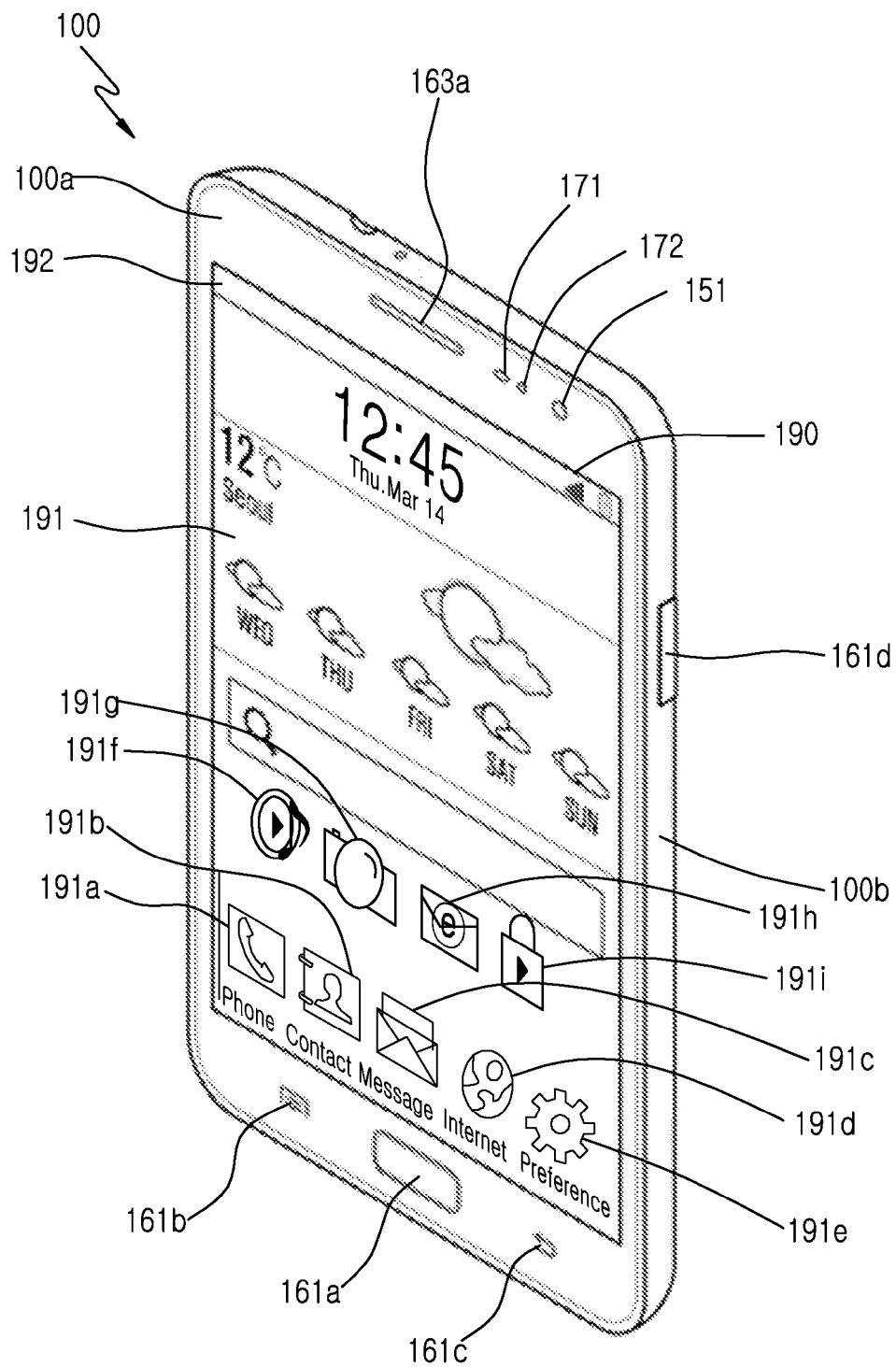
FIG. 2 shows an electronic device front perspective view according to invention principles.
Figure 3:
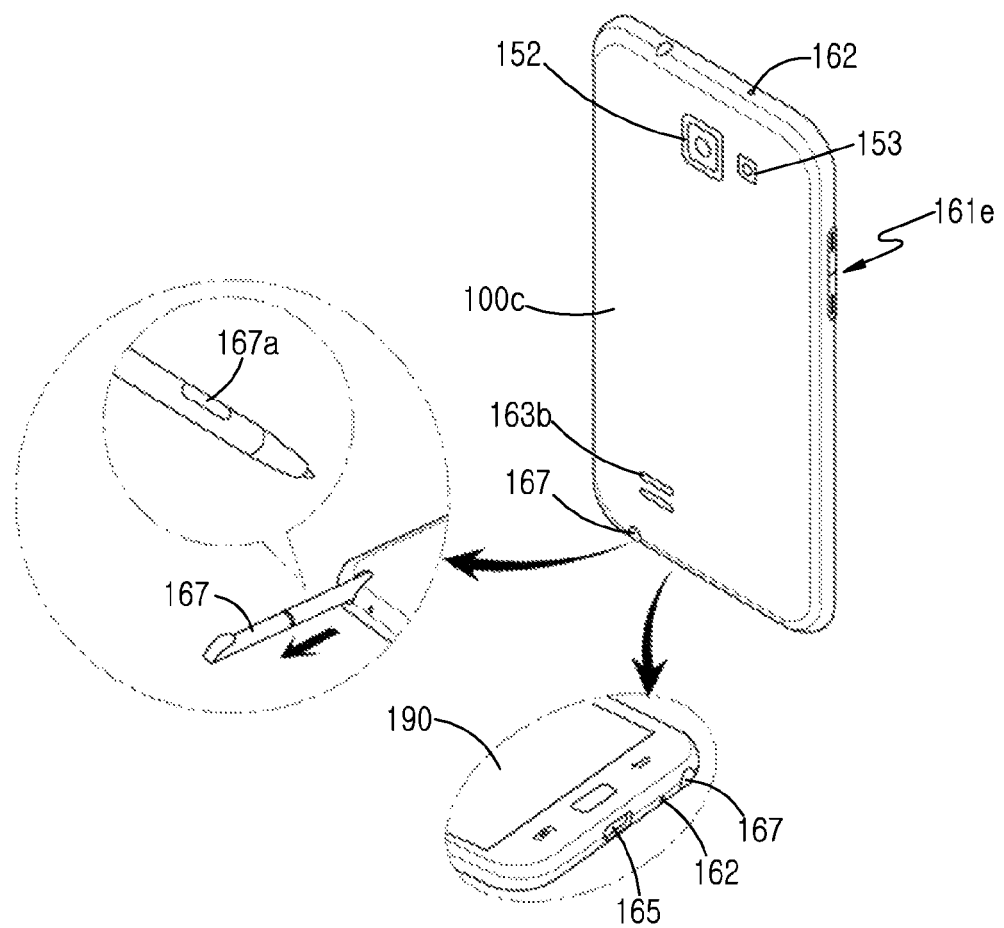
FIG. 3 shows a rear perspective view of an electronic device according to invention principles.

Referring to FIG. 2, when a user logs in the electronic device 100, a home screen is displayed on the touch screen 190. The electronic device 100 may have a plurality of different home screens. The home screen 191 may display shortcut icons 191a to 191i for executing frequently-used applications. A status bar 192 displays status of the electronic device 100 such as a battery charging status, the intensity of a received signal, and a current time on the top of the home screen 191. The status bar 601 (FIG. 6) may not be displayed on the home screen 191 of the electronic device 100. The first camera 151, the speaker 163a, the proximity sensor 171, and the illumination sensor 172 may be positioned at the top of the front 100a of the electronic device 100. The second camera 152, the flash 153, and the speaker 163b may be positioned at the rear 100c of the electronic device 100. The home button 161a, the menu button 161b, and the back button 161c may be positioned at the bottom of the front 100a of the electronic device 100. The button 161 may be implemented with a touch button instead of a physical button. Additionally, the button 161 and the home screen may be displayed on the touch screen 190.

The power/lock button 161d, the volume button 161e, and at least one mike 162 may be positioned at the side 100b of the electronic device 100. The connector 165 is formed at the bottom side of the electronic device 100. The connector 165 may be connected to an external device through a wire. Moreover, an insertion hole into which the input unit 167 having the button 167a is inserted may be positioned at the bottom side of the electronic device 100. The input unit 167 may be stored in the electronic device 100 through the insertion hole, and may be drawn from the electronic device 100 if necessary.

Figure 4:
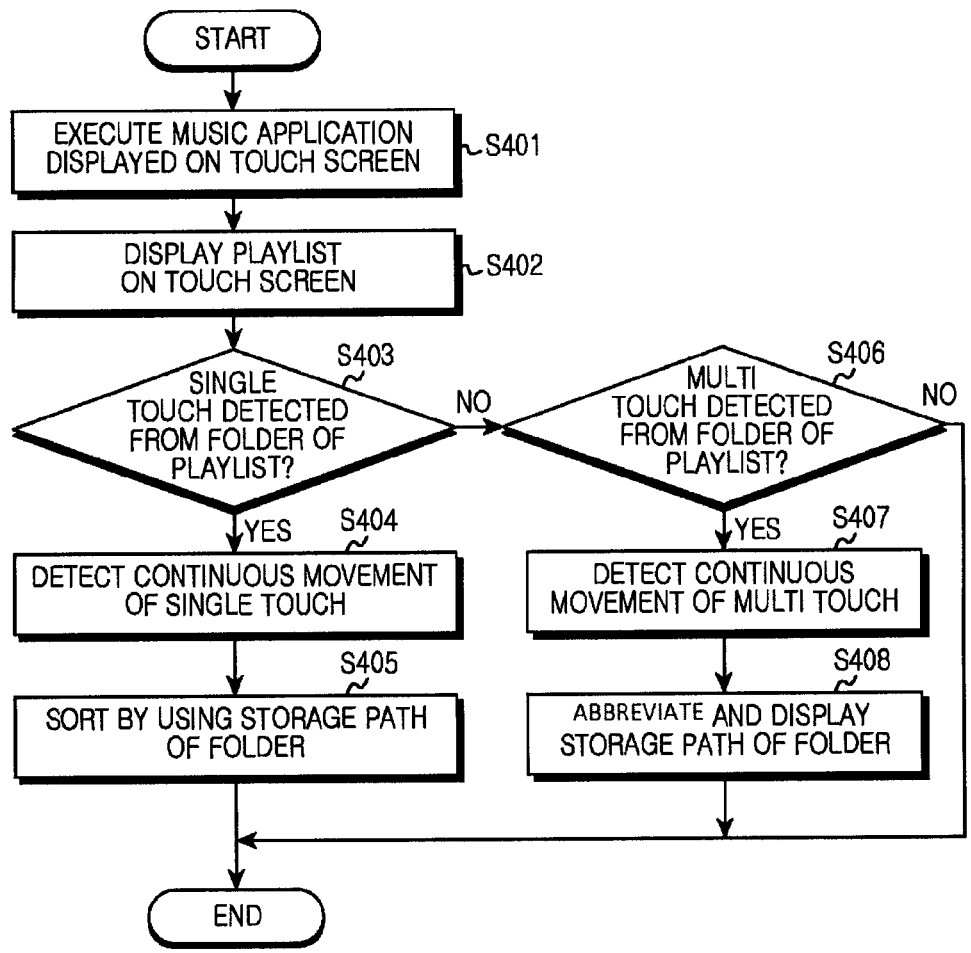
FIG. 4 shows a flowchart of a method of displaying a playlist of an electronic device according to invention principles.

FIG. 4 shows a flowchart of a method of displaying a playlist of an electronic device and FIGS. 5 to 13 illustrate a method of displaying the playlist. In step S401 of FIG. 4, a music application displayed on a touch screen is executed.

Figure 5:
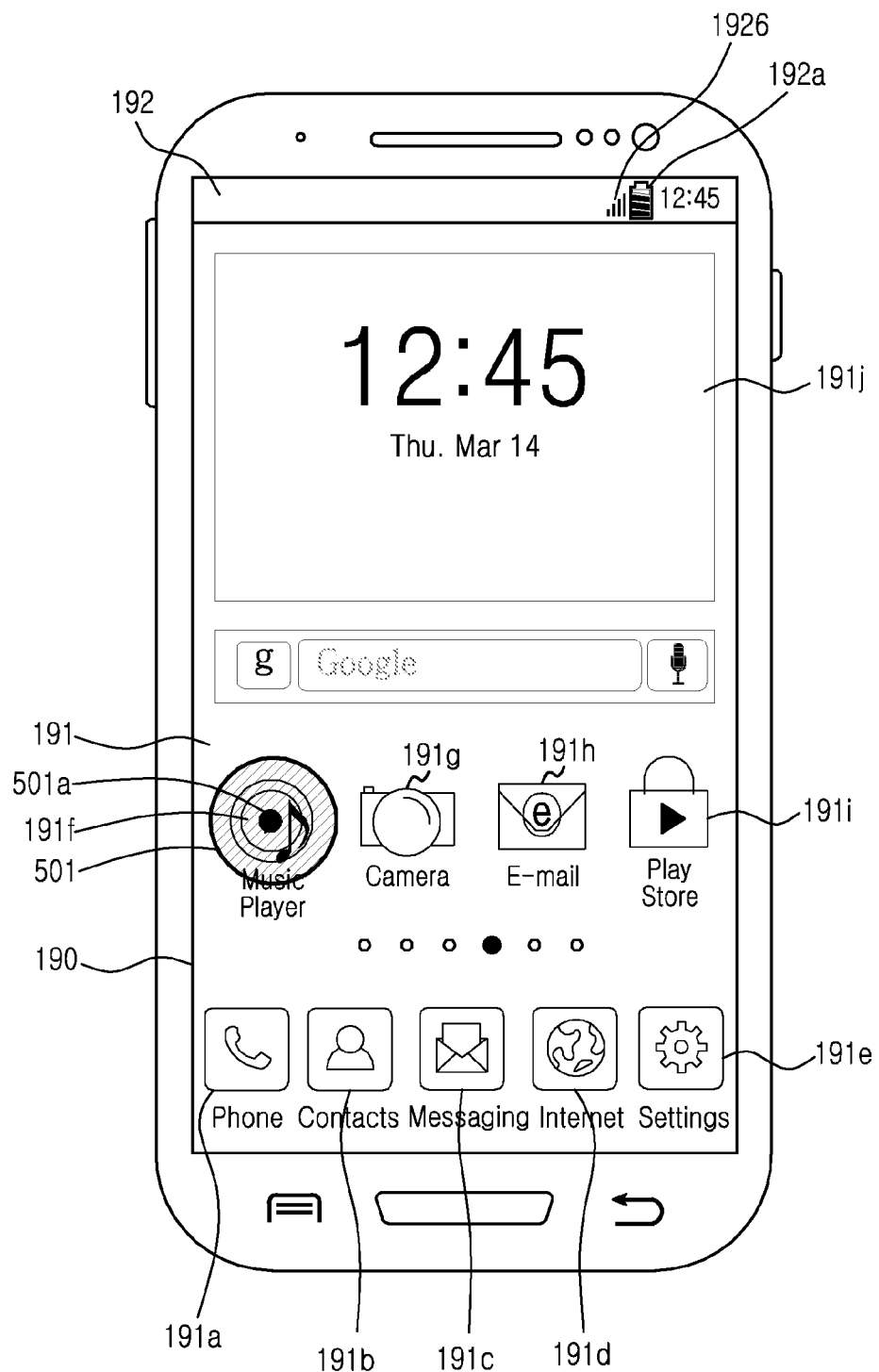
FIG. 5, FIG. 6, FIG. 7, FIG. 8, FIG. 9A, FIG. 9B, FIG. 9C, FIG. 10, FIG. 11, FIG. 12, FIG. 13A and FIG. 13B are views illustrating a method of displaying a playlist of an electronic device according to invention principles.

Referring to FIG. 5, a screen is displayed on the touch screen 190. The screen includes a home screen 191 and a status bar 192. The home screen 191 may display shortcut icons 191a to 191i corresponding to executable applications and/or at least one widget 191j executable in the electronic device 100. The status bar 192 displays a status of the display device 100 such as a battery charging status 192, the intensity of a received signal of a mobile phone 192b, or a vibration mode icon (not shown).

The status bar 192 may not be displayed on the screen 500 according to OS or application. When the status bar 192 is not displayed, only the home screen 191 may be displayed on the touch screen 190.

A touch 501 input by a user is detected from the shortcut icon 191f corresponding to a music application among shortcut icons displayed on the home screen 191. The control unit detects a first touch 501 from the shortcut icon 191f through the touch screen 190 and a touch screen controller. The control unit receives first position information (e.g., the X1 and Y1 coordinates corresponding to the first touch position 501a) corresponding to the first touch 501 from the touch screen controller. The control unit executes and displays a music application on a touch screen in response to the first touch detected from the shortcut icon 191f.

Figure 6:
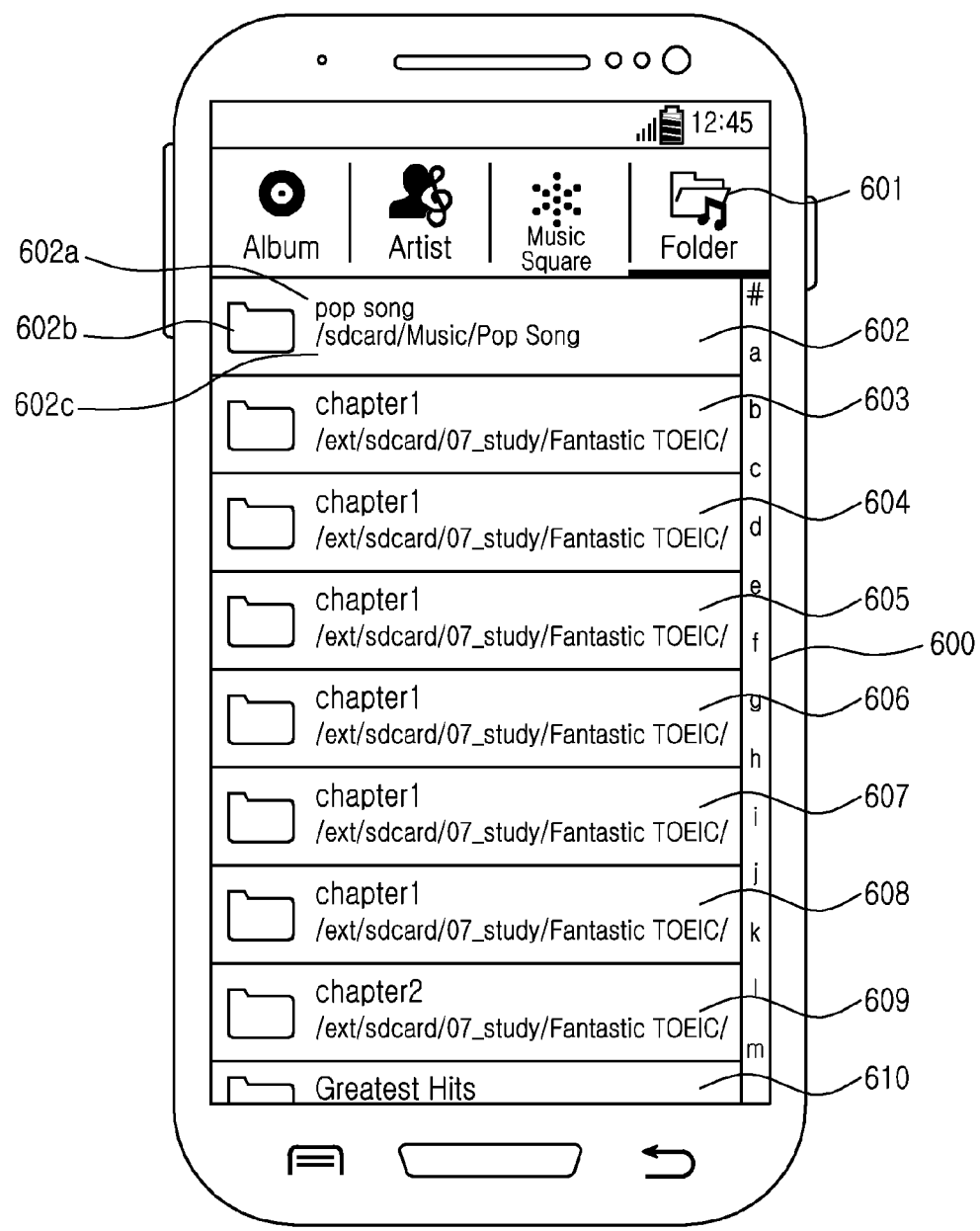

The control unit may store in a storage unit a touch on the touch screen 190, a touch detection time (e.g., 12:45), and touch information (e.g., a touch pressure) corresponding to a touch in the received first position information. The touch 501 detected from the shortcut icon 191f may be generated by one of the fingers including the thumb or the input unit 167 for a touch. In step S401 of FIG. 4, a touch is detected within a music application displayed menu. A touch may also be detected from another application (not shown) such as a video application or an application displaying a folder playlist. In step S402 of FIG. 4, the playlist is displayed on a touch screen. Referring to FIG. 6, a touch (not shown) input by a user is detected on a folder element 601 of a category that may include an album, an artist, a music square, and the folder. The control unit obtains a storage position of each sound source stored in the storage unit of the electronic device 100 in response to the detected touch, and, displays the playlist 600 by dividing the folder storing the sound source into folder unit classes.

For example, a pop song folder 602 displayed includes a folder name 602a indicated with text, a cover art 602b displayed with an image, and a storage path 602c of a folder storing a sound data source. Other folders 603 to 610 include folder names, cover art, and storage paths. In step S402 of FIG. 4, a music application displays a folder playlist including a sound source but in another application (e.g., a video application) a folder playlist (not shown) including a video source is displayed. Additionally, another application may include an application displaying another type of a folder playlist except an audio source and/or a vide source.

Referring to FIG. 6, the displayed folders 603 to 608 have the same name "chapter 1". In the storage paths of the folders 603 to 608, except a upper hierarchical class, storage paths from the root to a two-level upper hierarchical class are the same. Additionally, since the remaining storage paths in the storage paths of the folders 603 to 608 are not displayed, it is difficult to distinguish a stored sound source. The entire storage path of the first displayed Chapter1 folder 603 is /ext/sdcard/07_study/Fantastic TOEIC/Part2/chapter1, the entire storage path of the second displayed Chapter1 folder 604 is /ext/sdcard/07_study/Fantastic TOEIC/Part3/chapter1, the entire storage path of the third displayed Chapter1 folder 605 is /ext/sdcard/07_study/Fantastic TOEIC/Part4/chapter1, the entire storage path of the fourth displayed Chapter1 folder 606 is /ext/sdcard/07_study/Fantastic TOEIC/Part5/chapter1, the entire storage path of the fifth displayed Chapter1 folder 607 is /ext/sdcard/07_study/Fantastic TOEIC/Part6/chapter1, and the entire storage path of the sixth displayed Chapter1 folder 608 is /ext/sdcard/07_study/Fantastic TOEIC/Part7/chapter1. The entire storage path of the last displayed Chapter2 folder 609 is /ext/sdcard/07_study/Fantastic TOEIC/Part2/chapter2. That is, the storage path from the root to an upper hierarchical class is the same but the position of the final folder is different when compared to the folder 603.

Figure 7:
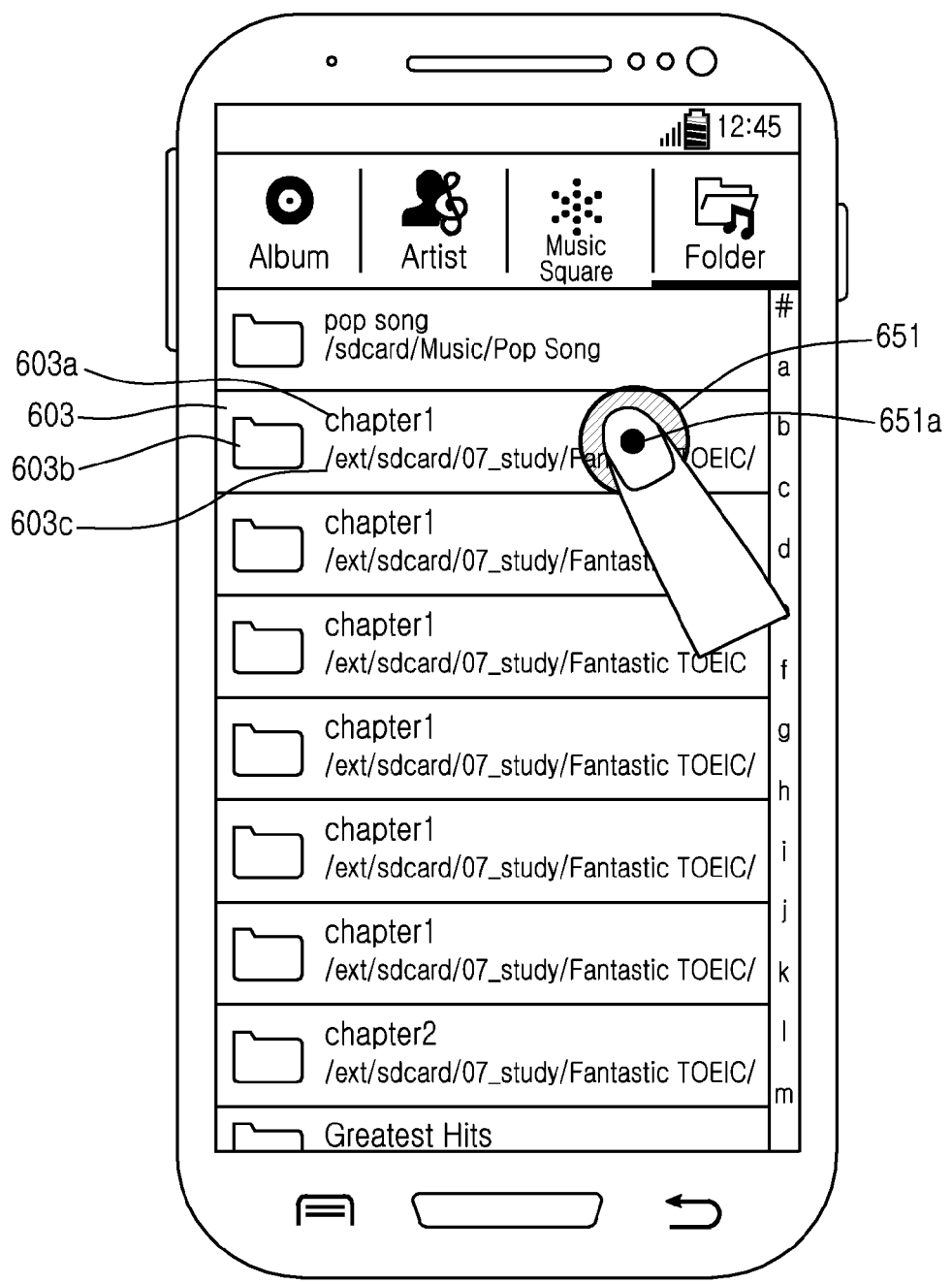
Figure 8:
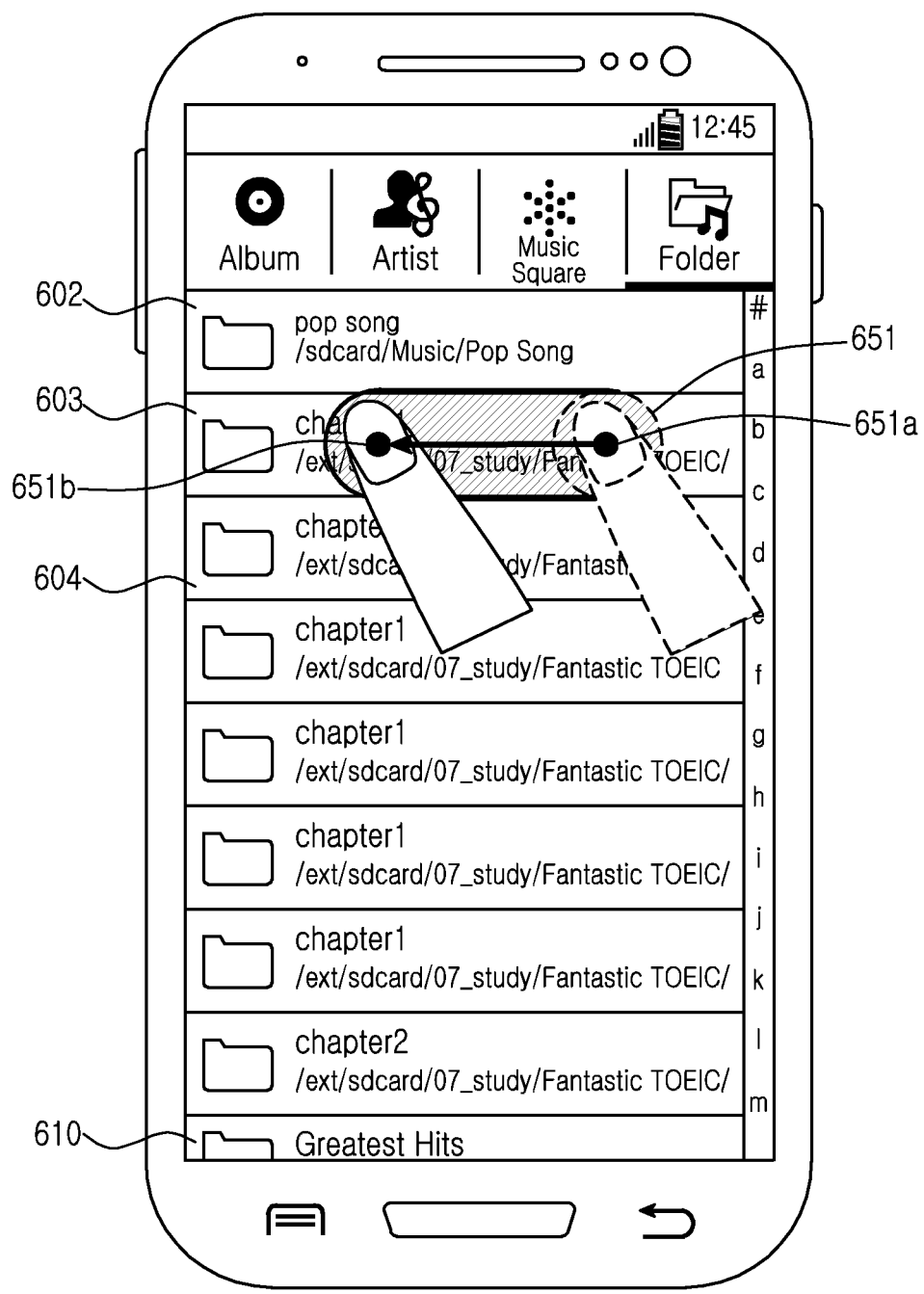

In step S403 of FIG. 4, a single touch is detected of the folder of the playlist. Referring to FIG. 7, a second touch 651 input by a user is detected from the chapter 1 folder 603 displayed on the playlist. The control unit detects the second touch 651 from the chapter 1 folder 603 through the touch screen 190 and a touch screen controller. The control unit receives second position information (e.g., the X2 and Y2 coordinates corresponding to the second touch position 651a) corresponding to the second touch 651 from the touch screen controller. The control unit may store in a storage unit data indicating a touch on the touch screen 190, a touch detection time (e.g., 12:45), and touch information (e.g., a touch pressure) corresponding to a touch in the received second position information. The control unit determines that the second touch 651 of the chapter 1 folder 603 is detected in response to the second position information. The chapter 1 folder 603 where the second touch is detected includes a folder name 603a, a cover art 603b, and a storage path 603c. The touch 2 detected of the chapter 1 folder 603 may be generated in response to finger or pen touch, for example.

In step S404 of FIG. 4, the continuous movement of a single touch is detected. Referring to FIG. 7, the continuous movement of the second touch 651 input by a user is detected from the chapter 1 folder 603 displayed on the playlist. The control unit may detect the continuous movement (e.g., a plurality of X and Y coordinates from the first detection touch position 651a to the last detection touch position 651b—FIG. 8) in a direction from the chapter 1 folder 603 to the cover art 603b through the touch screen 190 and the touch screen controller. The control unit receives second position information (e.g., a plurality of X2 and Y2 coordinates corresponding to the continuous touch) corresponding to the continuous movement of the second touch 651 from the touch screen controller. The continuous movement of the second touch 651 may include a continuous movement in a direction of the cover art 603b of the detected second touch 651 and a continuous movement (not shown) in an opposite direction of the cover art 603b of the second touch 651. The continuous movement of the second touch 651 means that a contact from the first detection touch position 651a to the last detection touch position 651b is continuously maintained on the playlist.

Figure 13B:
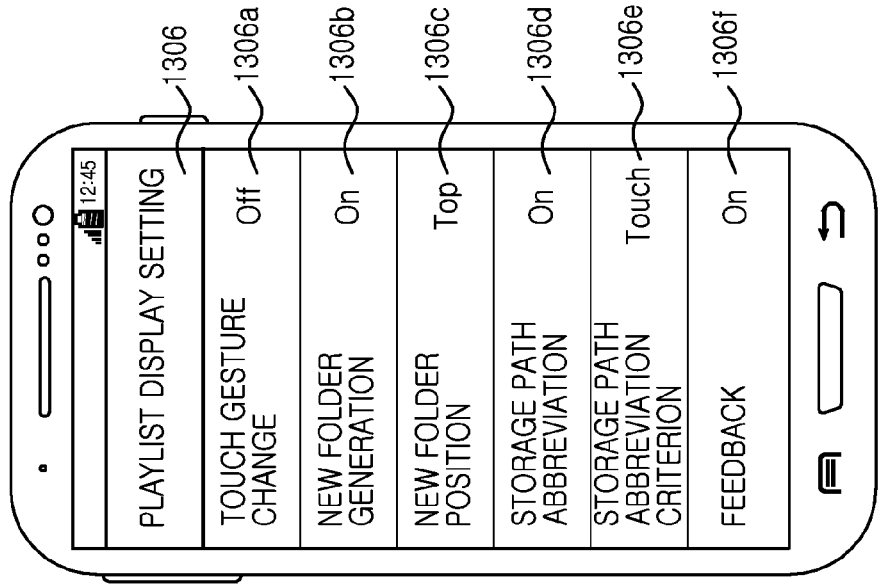
Figure 13A:
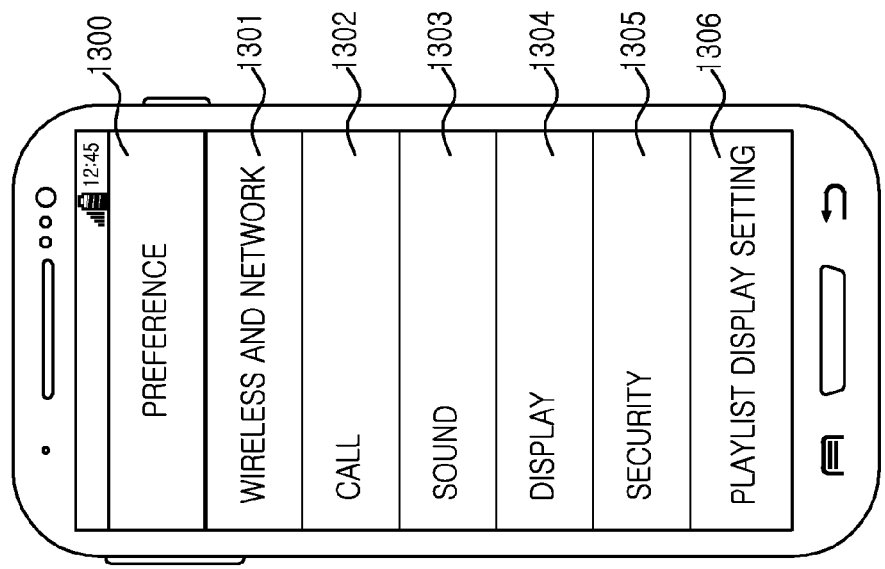

Additionally, the continuous movement of the second touch 651 means that a contact of more than a predetermined distance (e.g., 10 mm) from the first detection touch position 651a to the last detection touch position 651b is continuously maintained on the playlist. Referring to FIGS. 13(a) and 13(b), the predetermined distance may be selected and/or modified in the playlist display setting 1306.

Additionally, the continuous movement of the second touch 651 may include a vertical continuous movement in addition to a parallel continuous movement. In this case, this is distinguished from a scroll of a typical playlist. The second touch 651 may be input by a vertical continuous movement after a long press by a user (e.g., greater than 1 sec). When a long press is input from the second touch 651, an intuitive user guide corresponding to a vertical continuous movement direction may be displayed. For example, a user guide may be displayed in a top area (e.g., a "↑" or "⩞" icon indicating a top direction in the pop song folder 602) and a bottom area (e.g., a "↓", or "⩟" icon indicating a down direction in the chapter 1 folder 604) of the second touch 651 to be distinguished from the playlist (e.g., overlay). A linear touch gesture corresponding to the continuous movement of the second touch 651 includes a flick or drag gesture. Additionally, a nonlinear touch gesture corresponding to the continuous movement of the second touch 651 may include rotation. Referring to FIGS. 13(a) and 13(b), one touch gesture of flick, drag, and rotate gestures may be selected and/or modified by the touch gesture change 1306a of the playlist display setting 1306.

The control unit may provide user feedback in response to the continuous movement of the second touch to 651b. The provided feedback may comprise visual feedback, auditory feedback, and a haptic feedback or a combination thereof. The visual feedback may display a visual effect (e.g., an additional image, or an animation effect such as fade applied to an additional image) responding to the continuous movement of the second touch to 651b. The auditory feedback may be output from one of the first speaker 163a and the second speaker 163b, or both the first speaker 163a and the second speaker 163b. The tactile feedback may be output from the vibration motor 164. At least one type of feedback output may be maintained during touch movement from the first detection position 651a to position 651b. Referring to FIGS. 13(a) and 13(b), feedback corresponding to the continuous movement of a single touch may be selected and/or modified from the feedback 1306f of the playlist display setting 1306. Additionally, a time (e.g., about 0.5 sec) taken for providing at least one feedback to a user may be selected and/or modified in the playlist display setting 1306.

Figure 9A:
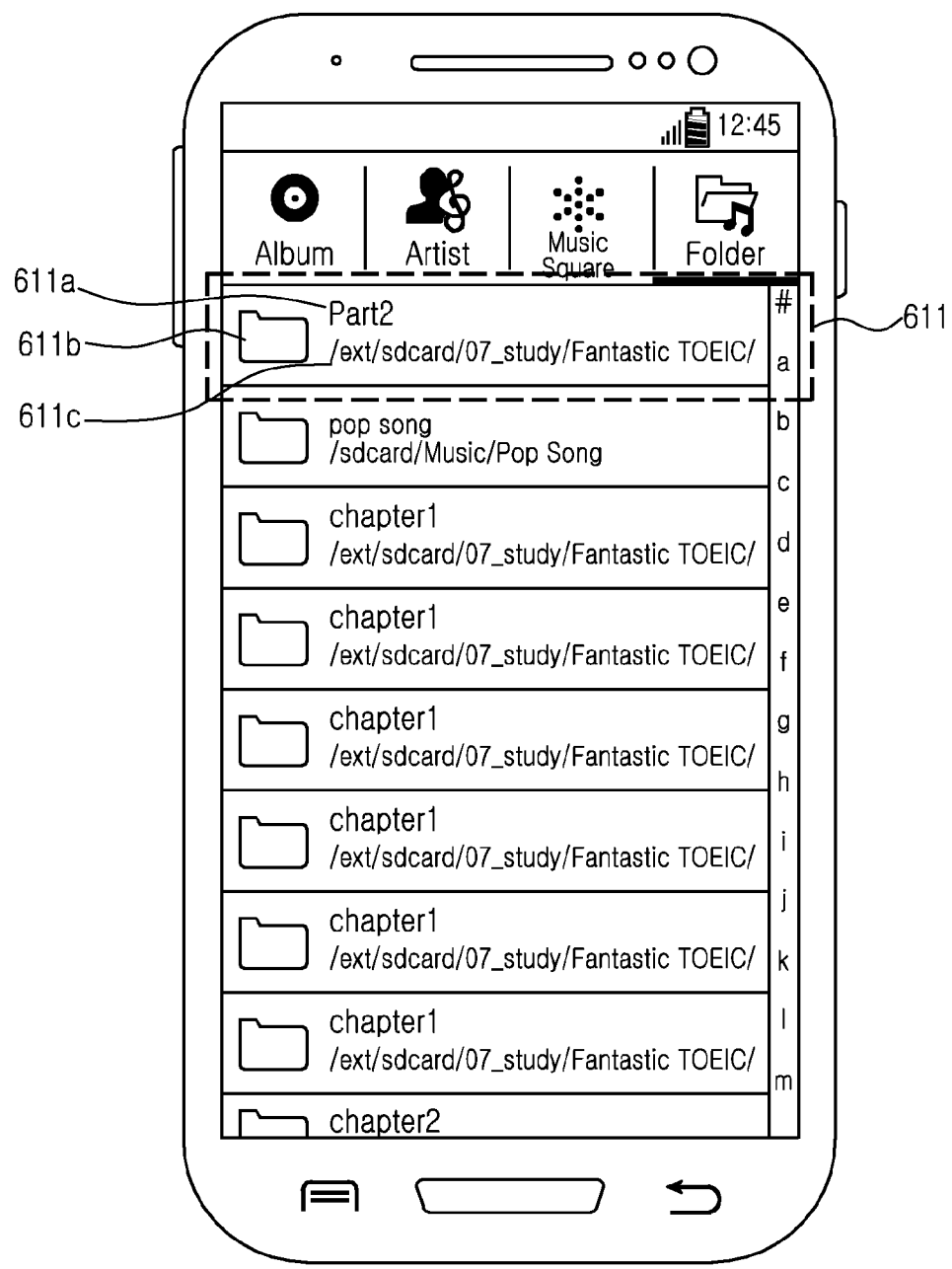

In step S405 of FIG. 4, folder sorting is performed using a storage path of a folder. Referring to FIG. 9A, the control unit generates and displays the new folder 611 in response to the continuous movement of the second touch. The new folder 611 includes a folder name 611a set to "Part 2", a cover art 611b, and a storage path 611c changed from existing "/ext/sdcard/07_study/Fantastic TOEIC/Part2/chapter1" to "/ext/sdcard/07_study/Fantastic TOEIC/Part2". The new folder 611 may include four folders distributed in an existing folder playlist (e.g., the storage path of the chapter1 folder 603 is "/ext/sdcard/07_study/Fantastic TOEIC/Part2/chapter1", the storage path of the chapter2 folder 609 is "/ext/sdcard/07_study/Fantastic TOEIC/Part2/chapter2", the storage path of the chapter3 folder (not shown) is "/ext/sdcard/07_study/Fantastic TOEIC/Part2/chapter3", and the storage path of the chapter 4 folder (not shown) is "/ext/sdcard/07_study/Fantastic TOEIC/Part2/chapter4".

The control unit may perform sorting (e.g., with sorting criterion indicating that "only the final folder is different and an upper hierarchical folder from the root is the same") on the basis of the storage path 603c of the folder 603 where the continuous movement of the second touch is detected. Referring to FIGS. 13(a) and 13(b), a sorting criterion may be selected and/or modified on the basis of the folder 603 where the continuous movement of the second touch is detected in the new folder position 1306c of the playlist display setting 1306. The control unit may generate a new folder 611 including four folders sorted based on the storage path 603c of the folder 603 where the continuous movement of the second touch. The control unit may display the generated new folder 611 on the top of a folder playlist to be distinguished from existing folders. Referring to FIGS. 13(a) and 13(b), the position of a new folder generated in response to the continuous movement of the second touch may be selected and/or modified in the new folder position 1306c of the playlist display setting 1306. The selectable position of a new folder includes a top of the playlist, a current position (original) of the folder 603 where the continuous movement of the second touch is detected, or a bottom of the playlist.

Figure 9B:
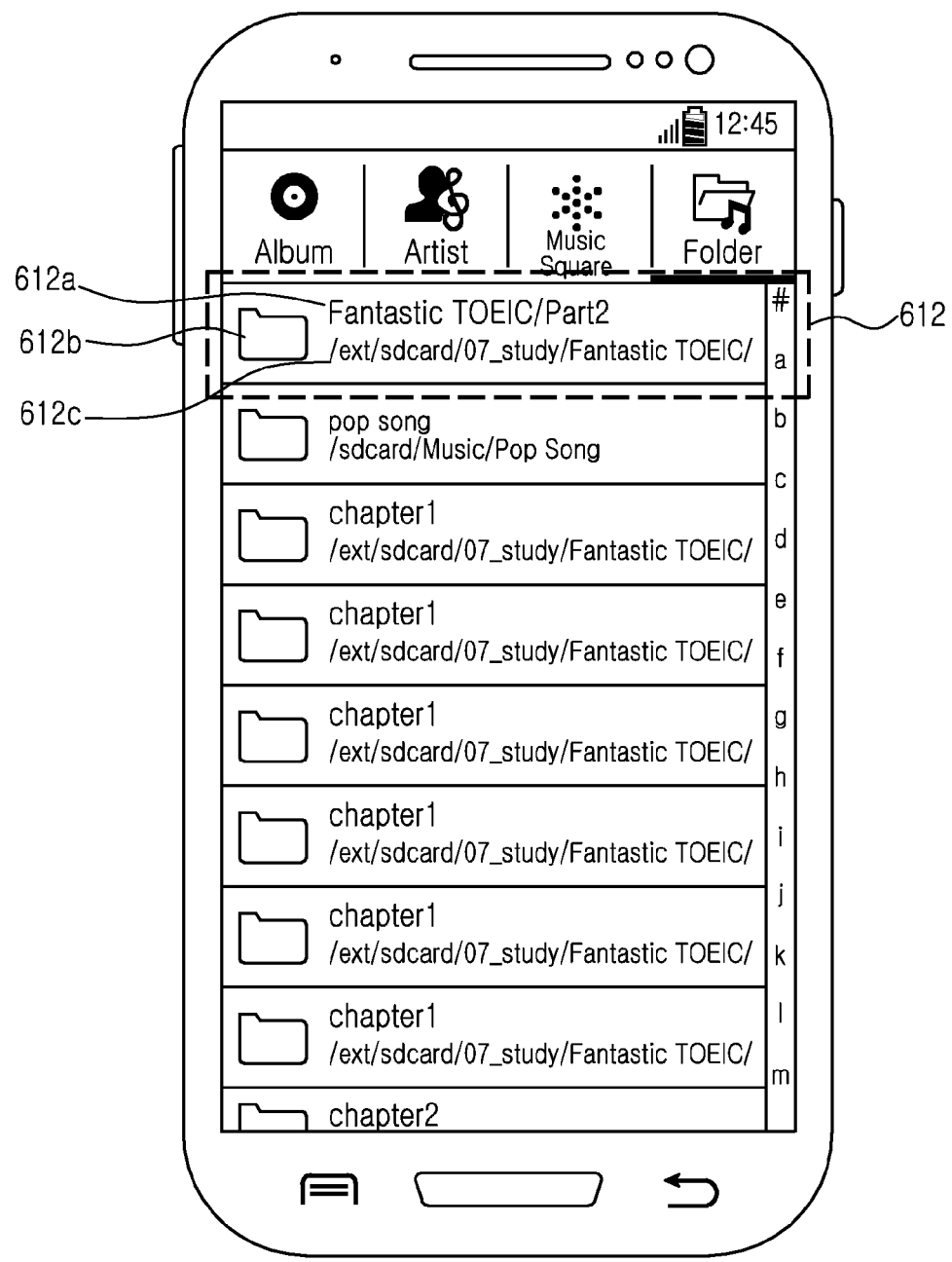
Figure 9C:
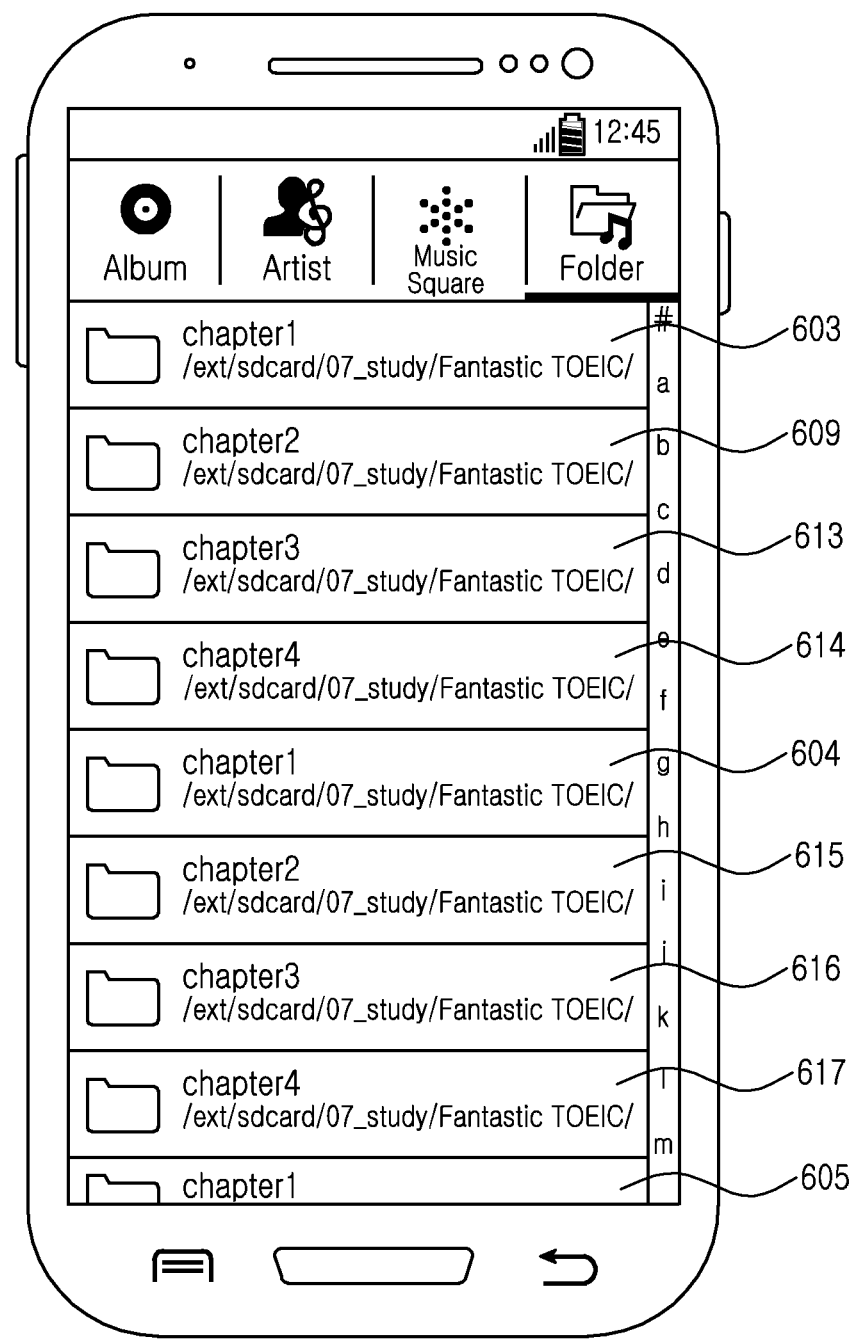

Referring to FIG. 9B, the control unit generates and displays the new folder 612 in response to the continuous movement of the second touch. The new folder 612 includes a folder name 612a set to "Fantastic TOEIC/Part 2", a cover art 612b, and a storage path 612c changed from existing "/ext/sdcard/07_study/Fantastic TOEIC/Part2/chapter1" to "/ext/sdcard/07_study/Fantastic TOEIC/Part2". Since the generation of the new folder 612 shown in FIG. 9B is substantially identical to that of the new folder 611 shown in FIG. 9A, redundant description is omitted. Referring to 9C, the control unit performs sorting by using the storage path 603c (FIG. 7) of the folder 603 where the continuous movement of the second touch is detected. Comparison of FIGS. 6 and 9C illustrates that sorting of folder order in a folder playlist in response to the continuous movement of the second touch. The folder order sorted in the folder playlist is as follows. As shown in FIG. 6, the storage path of the chapter1 folder 603 is "/ext/sdcard/07_study/Fantastic TOEIC/Part2/chapter1", the storage path of the chapter2 folder 609 is "/ext/sdcard/07_study/Fantastic TOEIC/Part2/chapter2". As shown in FIG. 9C, the storage path of the chapter3 folder 613 is "/ext/sdcard/07_study/Fantastic TOEIC/Part2/chapter3", the storage path of the chapter4 folder 614 is "/ext/sdcard/07_study/Fantastic TOEIC/Part2/chapter4", the storage path of the chapter2 folder 615 is "/ext/sdcard/07_study/Fantastic TOEIC/Part3/chapter2", the storage path of the chapter3 folder 616 is "/ext/sdcard/07_study/Fantastic TOEIC/Part3/chapter3", the storage path of the chapter4 folder 617 is "/ext/sdcard/07_study/Fantastic TOEIC/Part3/chapter4", and the storage path of the chapter1 folder 605 is "/ext/sdcard/07_study/Fantastic. The playlist is scrolled so hidden sorted folders may be displayed.

In step S405 of FIG. 4, when the control unit performs sorting by using the storage path 603c of the folder 603 in response to the detection of continuous movement of the second touch, the playlist displaying method of the electronic device 100 is terminated. In operation S403 of FIG. 4, when a single touch is not detected from the playlist of the electronic device 100, the method in operation S406 and S407, the control unit determines if a multiple touch is detected and if so performs step S408 of FIG. 4.

Figure 10:
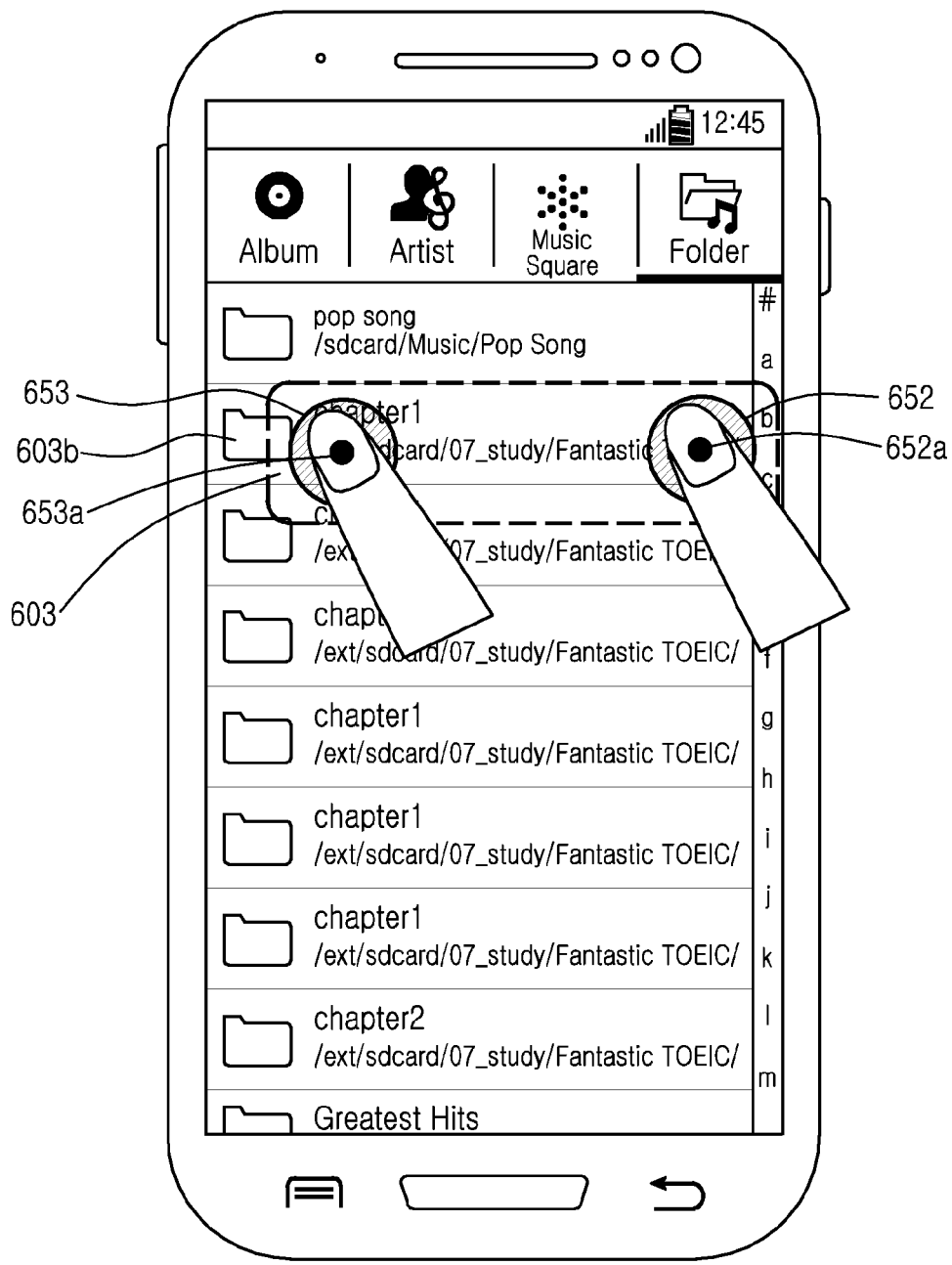

Referring to FIG. 10, a third touch 652 and a fourth touch 653 are detected from the chapter 1 folder 603 displayed on the playlist via touch screen 190. The control unit receives third position information (e.g., the X3 and Y3 coordinates corresponding to the third touch position 652a) corresponding to the third touch 652 from the touch screen controller. The control unit may store third position information in a storage unit, a touch detection time (e.g., 12:45), and touch information (e.g., a touch pressure) corresponding to a touch, and also a touch on the touch screen 190 in the received fourth position information, a touch detection time (e.g., 12:45), and touch information (e.g., a touch pressure) corresponding to the touch. The control unit determines that the third touch 652 and the fourth touch 653 are detected of the chapter 1 folder 603 by using the third and fourth position information.

Figure 11:
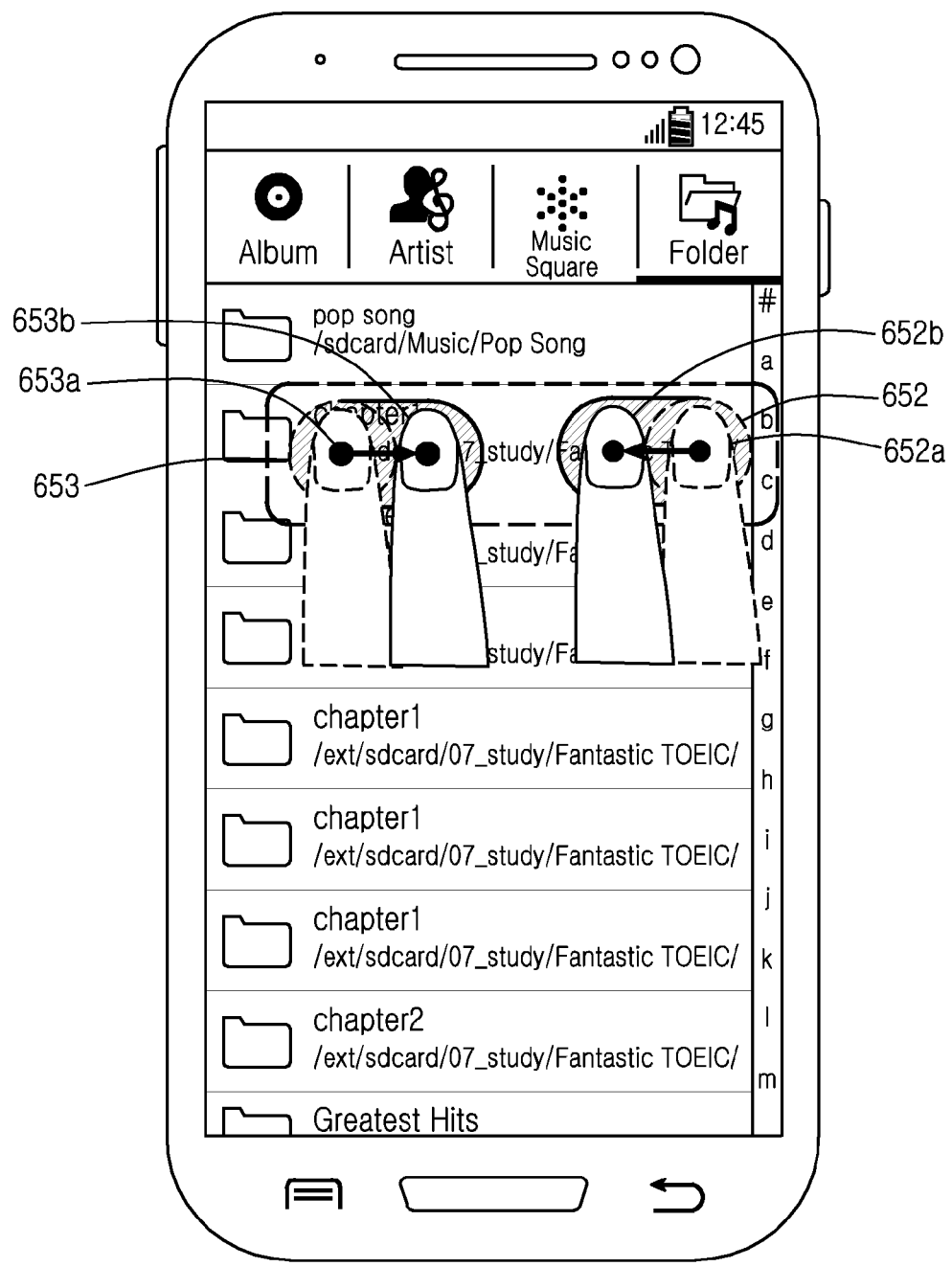

Referring to FIG. 11, the continuous movement of at least one of the third touch 652 and the fourth touch 653 is detected of the chapter 1 folder 603 displayed on the playlist. The control unit may detect the continuous movement (e.g., a plurality of X and Y coordinates from the first detection touch position to the last detection touch position) of at least one of the third touch 652 and the fourth touch 653 in the chapter 1 folder 603 through the touch screen 190. The control unit receives a third position information (e.g., a plurality of X and Y coordinates corresponding to the continuous touch of the third touch 652) and fourth position information (e.g., a plurality of X and Y coordinates corresponding to the continuous touch of the fourth touch 653), from the touch screen controller. The third and fourth position information corresponds to the continuous movement of at least one of the third touch 652 and the fourth touch 653

The continuous movement of at least one touch includes a movement of the third touch 652 toward the fourth touch 653 (e.g., a movement from the touch position 652a to the touch position 652b), a fixed movement of the fourth touch 653 (e.g., fixed to the touch position 653a), a movement of the fourth touch 653 toward the third touch 652 (e.g., a movement from the touch position 653a to the touch position 653b), a fixed movement of the third touch 652 (e.g., fixed to the touch position 652a), or a mutual movement of the third touch 652 and the fourth touch 653 (e.g., the third touch 652 moves from the touch position 652a to the touch position 652b, and a movement of the fourth touch 653 from the touch position 653a to the touch position 653b). Moreover, the continuous movement of at least one touch includes a movement (not shown) of the third touch 652 toward an opposite direction of the cover art 603b, a fixed movement of the fourth touch 653 (e.g., fixed to the touch position 653a), a movement of the fourth touch 653 (not shown) toward the cover art 603b, a fixed movement of the third touch 652 (e.g., fixed to the touch position 652a), a mutual movement of the third touch 652 and the fourth touch 653 (e.g., the third touch 652 moves in an opposite direction of the cover art 603b), and a movement (not shown) of the fourth touch 653 toward the covert art 603b. The continuous movement of the third touch 652 and the fourth touch 653 means that a contact of more than a predetermined distance (e.g., 10 mm) from the first detection touch position to the last detection touch position is continuously maintained on a playlist. Referring to FIGS. 13(a) and 13(b), the predetermined distance may be selected and/or modified in the playlist display setting 1306.

Additionally, the continuous movement of the multi touch 652 and 653 may include a vertical continuous movement (e.g., a direction of the pop song folder 602, or a direction of the Greatest hits folder 610) in addition to a parallel continuous movement. The multiple touch 652 and 653 may be input by a vertical continuous movement after a long press by a user (e.g., changed when more than 1 second expires). When a long press is input from the multiple touch 652 and 653, an intuitive user guide corresponding to a vertical continuous movement direction may be displayed. For example, a user guide may be displayed in a top area (e.g., a "↑" or "≈" icon indicating a top direction in the pop song folder 602) and a bottom area (e.g., a "↓", or "≋" icon indicating a down direction in the chapter 1 folder 604) of the multi touch 652 and 653 to be distinguished from a playlist (e.g., overlay).

A linear touch gesture corresponding to the continuous movement of the third touch 652 and the fourth touch 653 includes pinch or spread. Additionally, a nonlinear multiple touch gesture corresponding to the continuous movement of the third touch 652 and the fourth touch 653 may include rotation. The nonlinear multiple touch rotation gesture includes a rotation of one or both of the third touch 652 and the fourth touch 653. Referring to FIGS. 13(*a*) and 13(*b*), one multiple touch gesture among pinch, spread, and rotate may be selected and/or modified by the touch gesture change 1306*a* of the playlist display setting 1306. The control unit may provide feedback in response to termination of the continuous movement of the third touch 652 and the fourth touch 653.

Since the feedback provided from operation S407 of FIG. 4 is substantially to the same as that provided from operation S404 of FIG. 4, redundant description is omitted. Referring to FIGS. 13(*a*) and 13(*b*), a feedback (e.g., at least one of a visual feedback, an auditory feedback, and a haptic feedback) corresponding to the continuous movement of a single touch may be selected and/or modified from the feedback 1306*f* of the playlist display setting 1306. Additionally, referring to FIGS. 13(*a*) and 13(*b*), a time period (e.g., about 0.5 sec) over which feedback is provided may be selected and/or modified in the playlist display setting 1306. In step S408 of FIG. 4, the storage path of a folder is abbreviated and displayed.

Figure 12:
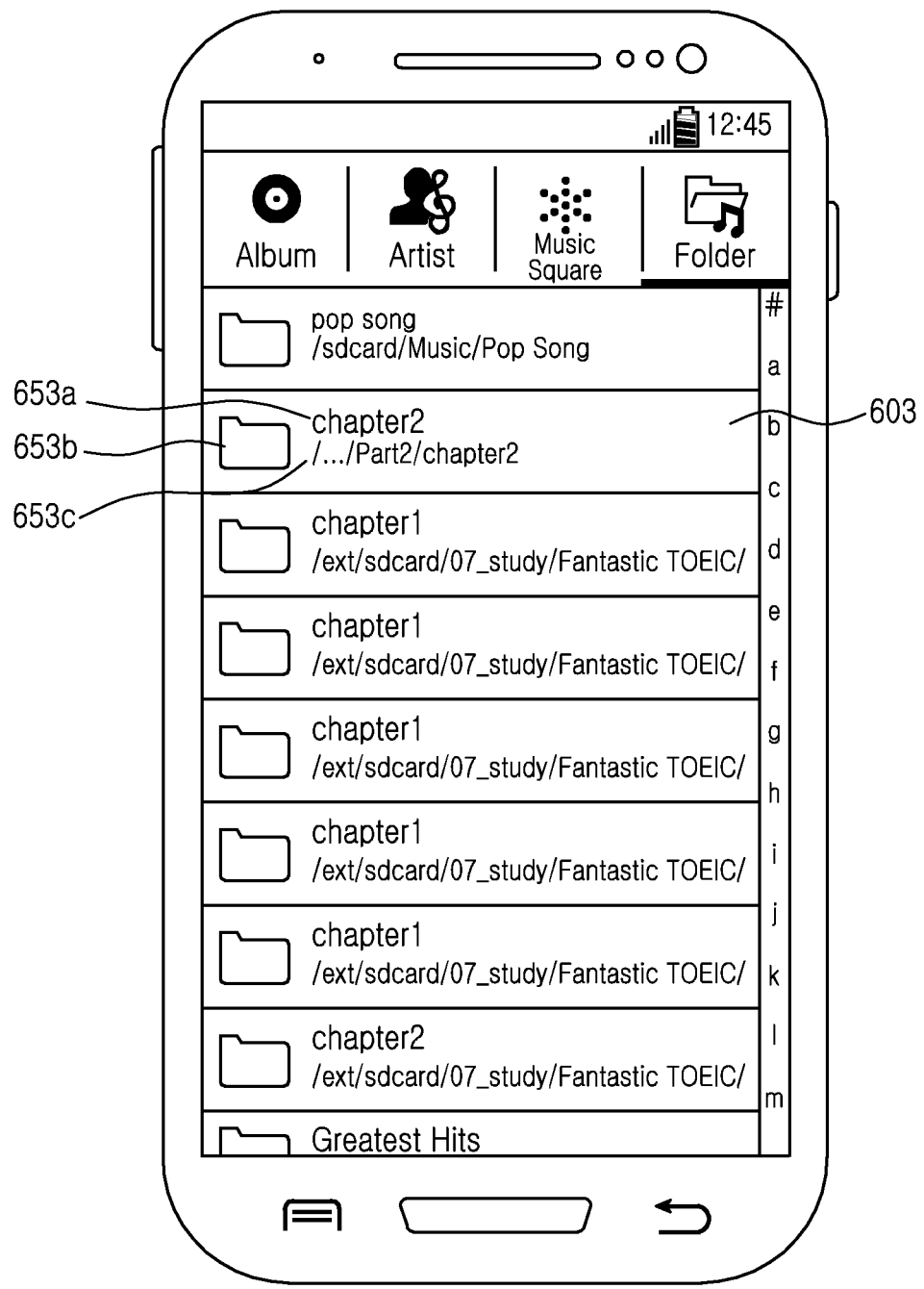

Referring to FIG. 12, the control unit abbreviates and displays the storage path 603*c* of the folder 603 in response to the continuous movement of at least one of the third touch 652 and the fourth touch 653. Abbreviating the storage path 603*c* may include abbreviating a upper hierarchical folder from the root except the current folder name 603*a* into "/ . . . /" on the current storage path of a folder and displaying it in response to the continuous movement of at least one of the multi touch. Abbreviating the storage path 603*c* may include abbreviating a two level hierarchical upper folder from the root into "/ . . . /" and displaying both the current folder name 603*a* and an upper hierarchical folder name on the current storage path, in response to the continuous movement of one or multiple touches.

Additionally, the control unit abbreviates a storage path into "/ . . . /" on the basis of the multiple touch positions 652*a* and 653*a* detected on the storage path 603*c* of the folder 603 in response to at least one continuous movement of the third touch 652 and the fourth touch 653 and displays it. For example, a storage path between a folder name including "TOEIC" where the touch position 652*a* of the third touch is detected (see FIG. 10) and a folder name including "ext" where the touch position 653*a* of the fourth touch is detected is abbreviated into "/ . . . /" and then, is displayed. Additionally, the control unit abbreviates a storage path into "/ . . . /" on the basis of the multiple touch positions 652*a* and 653*a* detected on the storage path 603*c* of the folder 603 in response to at least one continuous movement of the third touch 652 and the fourth touch 653 and displays it.

The abbreviation of the storage path 603*c* in the folder 602 corresponding to the continuous movement of a touch is sufficient when a user recognizes the fact that the storage path is abbreviated in addition to "/ . . . /". For example, it may be "/~/" or "/-/". It is apparent to those skilled in the art that one of "/ . . . /", "/~/", and "/-/" indicating the abbreviation of the storage path 603*c* in the playlist display setting 1306 may be selected and/or modified. There is no change in the folder name 603*a* and the cover art 603*b* of the folder 603. Additionally, there is no change in a sound source (not shown) stored in the folder 603. Referring to FIGS. 13(*a*) and 13(*b*), whether to abbreviate the storage path 603*c* of the folder 603 may be selected and/or modified in the storage path abbreviation 1306*d* of the playlist display setting 1306, in response to at least one continuous movement of the multi touch. Moreover, in response to one continuous movement of the multiple touch, the criterion (e.g., a current folder and upper hierarchical folder display or a storage path abbreviation between a multi touch) on the abbreviation of the storage path 603*c* of the folder 603 may be selected and/or modified. It is apparent to those skilled in the art that in response to one continuous movement of the multiple touch, the criterion on the abbreviation for the storage path 603*c* of the folder 603 may vary in response to application context. In step S408 of FIG. 4, when the control unit abbreviates and displays the storage path 603*c* of the folder 603 in response to the continuous movement of at least one of the third touch 652 and the fourth touch 653, the playlist displaying method of the electronic device 100 is terminated.

FIG. 13 shows a playlist display setting. Referring to FIG. 5, a touch (not shown) input by a user is detected from a preference setting shortcut icon 191*e* of the home screen 191 displayed on the touch screen 190. The control unit displays a preference setting screen in response to a touch (not shown) detected from the preference setting shortcut icon 191*e*. Referring to FIG. 13(A), an item of the displayed preference setting 1300 includes a wireless and network 1301, a call 1302, a sound 1303, a display 1304, a security 1305, and a playlist display setting 1306. Setting items displayed in the preference setting 1300 may be added or removed depending on requirements for the electronic device 100. A touch (not shown) input is detected from the playlist display setting 1306 of the preference setting screen displayed on the touch screen 190. The control unit displays a playlist display setting 1306 in response to a touch (not shown) detected from the playlist display setting 1306.

Referring to FIG. 13(B), the playlist display setting 1306 includes: a touch gesture change 1306*a* having a current setting of Off and selecting/changing one of gestures (e.g., flick, drag, or rotate) of a single touch 651 or one of gestures (e.g., pinch, spread, or rotate) of the multiple touch 652 and 653; a new folder generation 1306*b* having a current setting of On and generating a new folder in response to the continuous movement of the single touch 651; a new folder position 1306*c* having a current setting of Top and selecting/changing the position of a new folder; a storage path abbreviation 1306*d* having a current setting of On and abbreviating a storage path of a folder where the continuous movement of at least one touch of a multiple touch is detected; a storage path abbreviation criterion 1306*e* having a current setting of Touch for abbreviating a storage path and selecting a criterion for abbreviating a storage path; and a feedback 1306*f* having a current setting of On and selecting at least one of a visual feedback, an auditory feedback, and a haptic feedback corresponding to the detection of a continuous movement of a single touch and a multiple touch.

The display setting 1306 may further include (not shown): a time interval (e.g., about 500 msec) between multiple touches detected as a multiple touch; a sorting criterion (e.g., a current folder, one level upper folder, or a two level hierarchical upper folder) performing sorting based on a folder where the continuous movement of a second touch is detected; and a setting distance (e.g., about 10 mm) detected through the continuous movement of a single touch and a multiple touch. Additionally, it is apparent to those skilled in the art that the playlist display setting 1306 may be set in the preference setting 1300, but the playlist display setting 1306 may be selected and/or changed in a preference setting (not shown) displayed by executing a music application and selecting the menu button 161*b*. According to a performance and a function that the electronic device 100 supports, items of the playlist display setting 1306 may be added or deleted.

The embodiments of the present invention can be written as computer programs and can be implemented in general-use digital computers that execute the programs using a computer readable recording medium. The computer readable recording medium may include each or a combination of program commands, data files, and data structures. For example, examples of the computer readable recording medium include magnetic storage media (e.g., ROM, floppy disks, hard disks, etc.) and optical recording media (e.g., CD-ROMs, or DVDs). A memory in a mobile terminal is one example of a storage medium that can be read by a device for storing a program or programs including instructions for implementing embodiments of the present invention. The program instructions written on the medium may be especially designed and configured for the present invention or may be known to computer software engineers.

An electronic device sorts a folder name in a storage path of a current folder of an application in response to a touch and/or a touch gesture and displays a playlist. The electronic device generates a new folder name representation having one of, an upper hierarchical folder name and a two level hierarchical upper folder name comprising a current storage path of a folder in response to touch detection. The electronic device abbreviates a storage path name representation of a folder displayed on an application in response to a multiple touch and/or a multiple touch gesture. The electronic device abbreviates and displays both a current folder name and an upper hierarchical folder name of a current storage path of a folder displayed on an application in response to a multiple touch and/or a multiple touch gesture.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A user interface method of an electronic device, the method comprising:
    displaying on a touch screen a list of folders, wherein a first folder and a second folder in the list are each displayed with text corresponding to storage paths of the first folder and the second folder, the text indicating a name of at least one upper hierarchical folder common to the first folder and the second folder, and wherein all of the text displayed for the first folder is identical to all of the text displayed for the second folder;
    detecting a continuously moving single-touch touch gesture that selects the first folder or the second folder in the list of folders;
    in response to the detected continuously moving single-touch touch gesture, performing a sorting operation to change an order of items stored in the upper hierarchical folder from a first sequence to a second sequence, wherein the items arranged in the first sequence are ordered differently than the items arranged in the second sequence, and wherein prior to the sorting operation, at least one item among the items to be sorted is not displayed on the touch screen;
    in response to performance of the sorting operation, detecting a multiple-touch touch gesture selecting a folder in the list of folders, wherein the multiple-touch touch gesture comprises a continuous movement of at least one touch point of the multiple-touch touch gesture; and
    abbreviating a text portion of the storage path of the selected folder and displaying the abbreviated text portion of the storage path in response to the detected multiple-touch touch gesture.

2. The method of claim 1, wherein the performing of the sorting operation further comprises:
    generating a new folder for displaying a result of the sorting operation, the new folder having a new name that includes the name of the upper hierarchical folder, a name of the first folder, and/or a name of the second folder; and
    displaying the new folder in the list of folders.

3. The method of claim 2, wherein a location of the new folder in the list of folders is changeable according to user input.

4. The method of claim 1, wherein the continuously moving single-touch touch gesture comprises a physical contact that is continuously maintained on the touch screen.

5. The method of claim 1, wherein the continuously moving single-touch touch gesture includes at least one of a flick, drag, and rotate movement.

6. The method of claim 1, wherein displaying the abbreviated text portion of the storage path includes displaying the name of the upper hierarchical folder and a name of the selected folder.

7. The method of claim 1, further comprising performing the abbreviation operation on at least one other folder having a second storage path including the name of the upper hierarchical folder.

8. The method of claim 1, wherein the multiple-touch touch gesture comprises a pinch, spread, or rotate gesture.

9. An electronic device comprising:
    a touch screen displaying a list of folders, wherein a first folder and a second folder in the list are each displayed with text corresponding to storage paths of the first folder and the second folder, the text indicating a name of at least one upper hierarchical folder common to the first folder and the second folder, and wherein all of the text displayed for the first folder is identical to all of the text displayed for the second folder; and a control unit controlling the touch screen, wherein the control unit:
- detects a continuously moving single-touch touch gesture that selects the first folder or the second folder in the list of folders,
- in response to the detected continuously moving single-touch touch gesture, performs a sorting operation to change an order of items stored in the upper hierarchical folder from a first sequence to a second sequence, wherein the items arranged in the first sequence are ordered differently than the items arranged in the second sequence, and wherein prior to the sorting operation, at least one item among the items to be sorted is not displayed on the touch screen,
- in response to performance of the sorting operation, detects a multiple-touch touch gesture selecting a folder in the list of folders, wherein the multiple-touch touch gesture comprises a continuous movement of at least one touch point of the multiple-touch touch gesture; and
- abbreviates a text portion of the storage path of the selected folder and displays the abbreviated text portion of the storage path in response to the detected multiple-touch touch gesture.

10. The electronic device of claim 9, wherein the control unit further:
- generates a new folder for displaying a result of the sorting operation, the new folder having a new name that includes the name of the upper hierarchical folder, a name of the first folder, and/or a name of the second folder; and
- displays the new folder in the list of folders.

11. The electronic device of claim 9, wherein the continuously moving single-touch touch gesture comprises a flick, drag, or rotate gesture.

12. The electronic device of claim 9, wherein the multiple-touch touch gesture comprises at least one of one of a pinch, spread, a rotate gesture, a fixed touch, and a continuous movement of each touch of the multiple touch.

* * * * *